INVENTORS
ROBERT B. TAYLOR
ROBERT G. WALKER
BY Albert L. Jeffers
ATTORNEYS

INVENTORS
ROBERT B. TAYLOR
ROBERT G. WALKER
BY Albert L. Jeffers
ATTORNEYS

Aug. 10, 1965  R. B. TAYLOR ETAL  3,199,728
CONTROL DEVICE FOR LIQUID DISPENSERS
Original Filed May 19, 1961  16 Sheets-Sheet 8

*INVENTORS*
ROBERT B. TAYLOR
ROBERT G. WALKER
BY
*Albert L. Jeffers*
ATTORNEYS

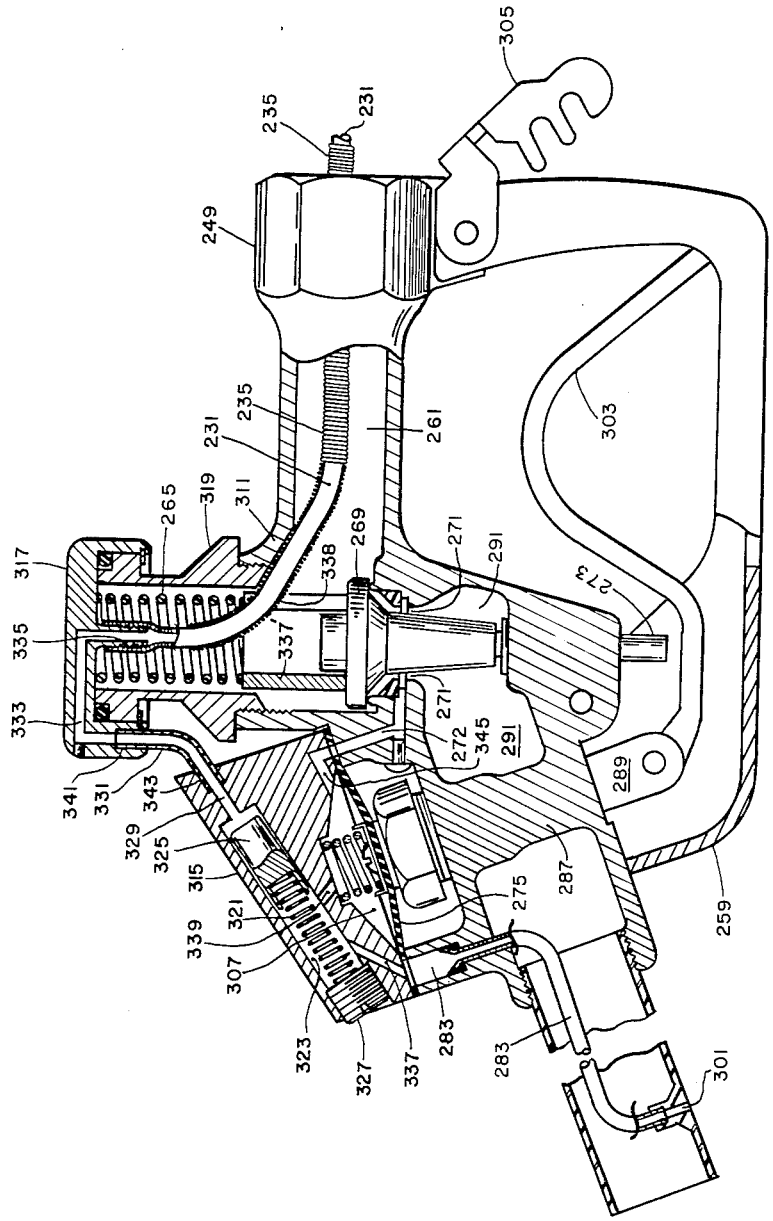

Aug. 10, 1965                R. B. TAYLOR ETAL                3,199,728
                      CONTROL DEVICE FOR LIQUID DISPENSERS
Original Filed May 19, 1961                              16 Sheets-Sheet 12

*INVENTORS*
ROBERT B. TAYLOR
ROBERT G. WALKER
BY *Albert L. Jeffers*

ATTORNEYS

Aug. 10, 1965     R. B. TAYLOR ETAL     3,199,728
CONTROL DEVICE FOR LIQUID DISPENSERS
Original Filed May 19, 1961     16 Sheets-Sheet 13

INVENTORS
ROBERT B. TAYLOR
ROBERT G. WALKER
BY
Albert L. Jeffers
ATTORNEYS

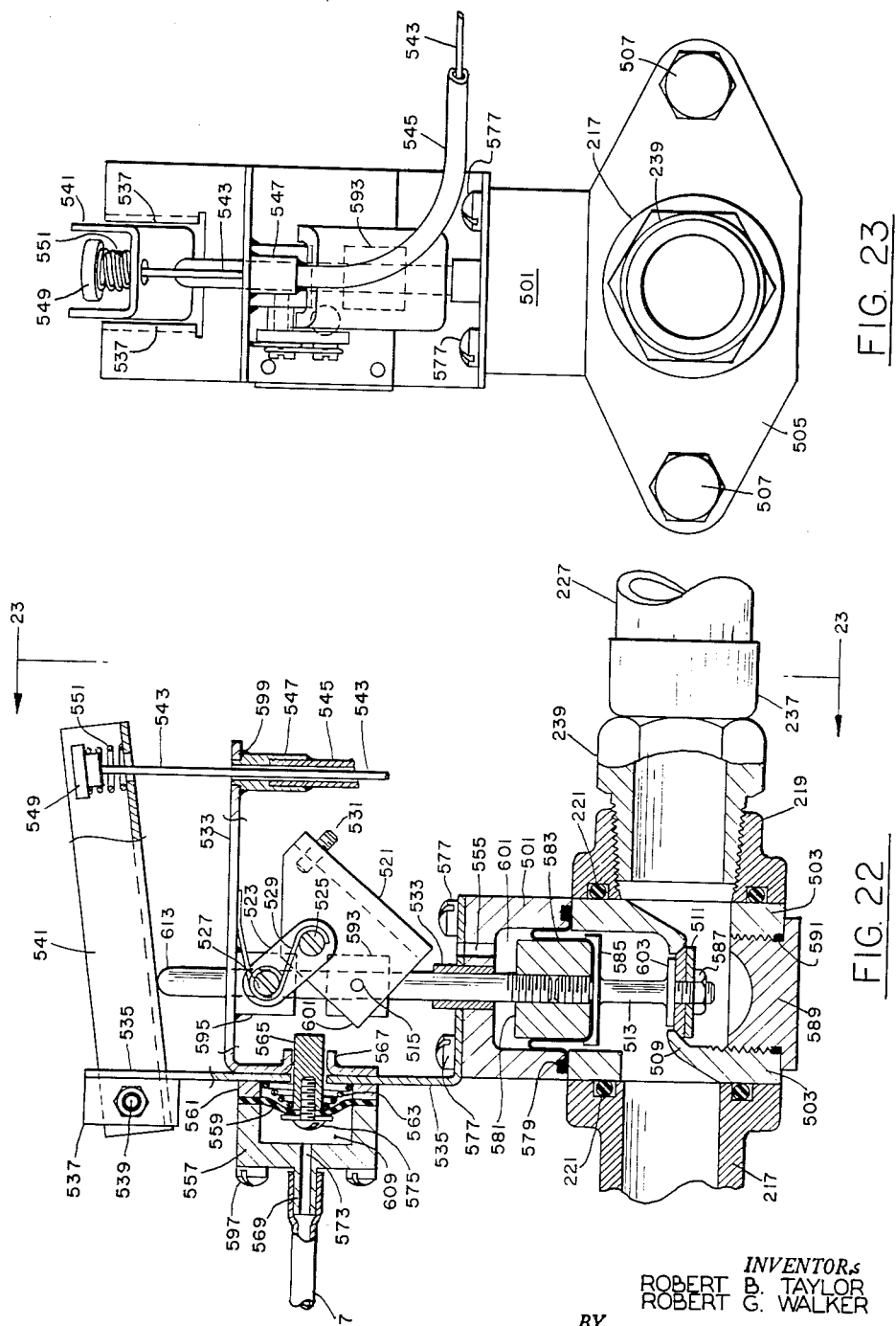

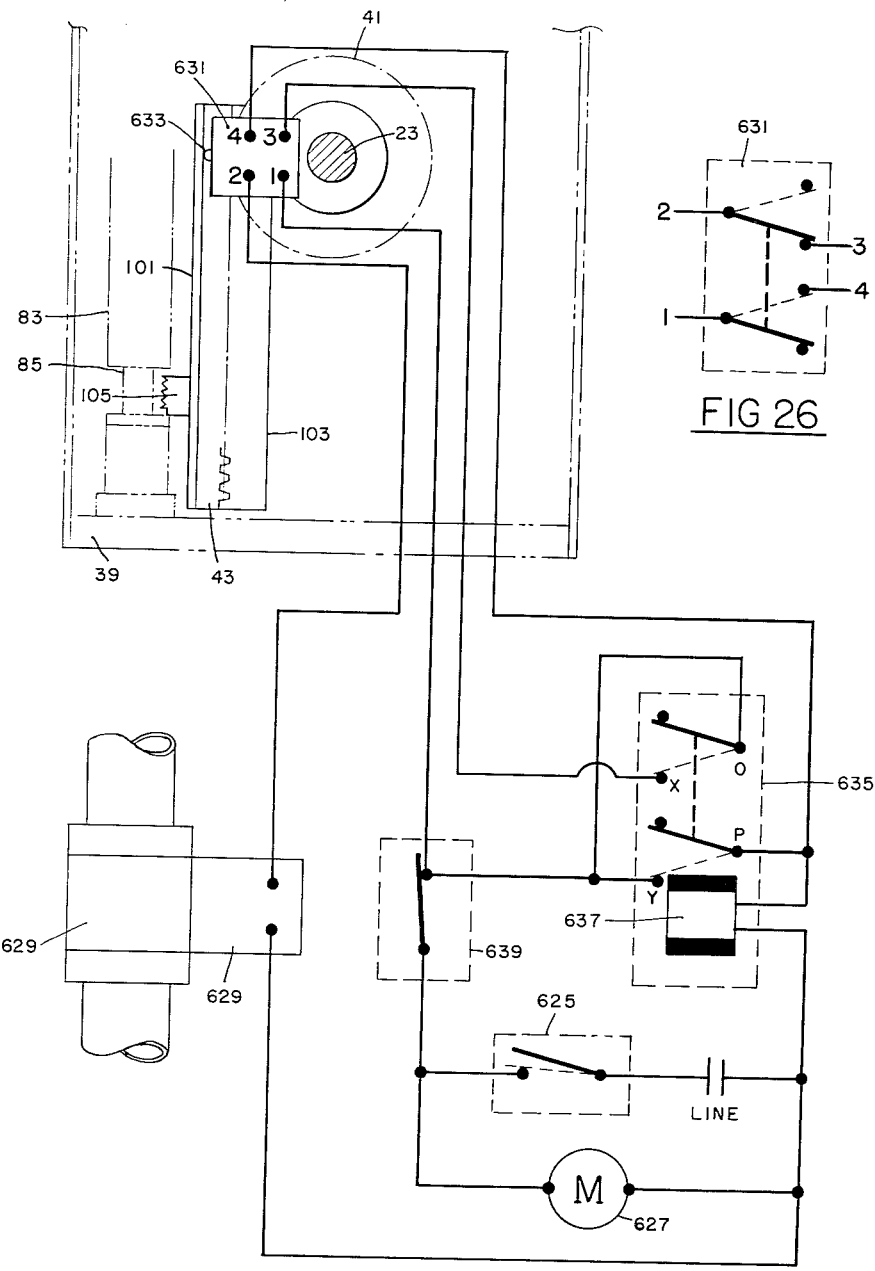

United States Patent Office 3,199,728
Patented Aug. 10, 1965

3,199,728
CONTROL DEVICE FOR LIQUID DISPENSERS
Robert B. Taylor and Robert G. Walker, Fort Wayne, Ind., assignors to August J. Lassus, Jr., Elmer L. Lassus, and William F. Lassus, all of Fort Wayne, Ind.
Continuation of application Ser. No. 111,330, May 19, 1961. This application Mar. 23, 1964, Ser. No. 355,992
18 Claims. (Cl. 222—29)

This is a continuation of patent application, Serial No. 111,330, filed May 19, 1961, entitled "Control Device for Liquid Dispensers."

This invention relates to a control device for liquid dispensers having particular utility in cooperation with liquid fuel dispensing apparatus.

It is a principal object of the present invention to provide a control device for automatically operating flow control valves of gasoline and other fuel dispensers whereby a predetermined amount of a fuel may be delivered accurately without continued attention on the part of the service station operator and which can be attached to substantially any conventional computer type dispenser.

It is a further particular object of the present invention to provide a control device for automatically shutting off liquid flow from an outlet nozzle of a dispenser when a selected monetary value of the liquid has flowed through the outlet nozzle.

A further object is to provide such a device which may be attached to substantially any conventional fuel dispensing device without substantial modification thereof and which may be selectively utilized to control the flow from the dispenser outlet or the dispenser may be employed without control from the control device.

A further object is to provide a control device for liquid dispensers wherein the flow of liquid may be interrupted or stopped at the outlet nozzle or at any preselected zone between the outlet nozzle and the fluid pumping means.

Further objects are to provide such a control device for liquid dispensers that is compact, requires no independent source of power, is readily attachable and detachable from conventional fluid dispensing devices, is relatively inexpensive to manufacture, reliable in use, and safeguarded against explosive hazards when dispensing readily flammable fuels.

These and other objects and advantages are provided in a liquid dispenser having a liquid supply means adapted to convey liquids from a source thereof to an outlet nozzle, said nozzle having a suitable control valve, a computer, a flow metering device adapted to determine the volume discharge through said outlet nozzle, a control device cooperating with the liquid dispenser and adapted to discontinue liquid flow from said outlet nozzle when a selected monetary value of liquid has flowed therethrough, said control device comprising: actuator means connected to the computer to be driven thereby at the rate proportional to the flow of fluid through the flow metering device, impulse pressure means adapted to close the control valve, impulse pressure release means actuated by the actuator means, and manually operated means for cocking and for setting the impulse pressure release means at a position corresponding to a selected monetary value of fluid flowing through the flow metering device.

The invention will be more particularly described in reference to the accompanying drawings wherein:

FIGURE 17 is a fragmentary side section of the fuel dispensing nozzle modified to include the features of the present invention;

FIGURE 22 is a fragmentary partial sectional view of the device shown in FIGURE 21 with the control valve in the closed position;

FIGURE 23 is a section substantially on line 23—23 of FIGURE 22;

FIGURE 25 is a diagrammatical representation of an electrical control device for liquid dispensers embodying the principles of the present invention;

FIGURE 26 is a diagrammatic view of a double throw, double pole switch utilized in the electrical control device shown in FIGURE 25.

Description of invention

Figure 1:
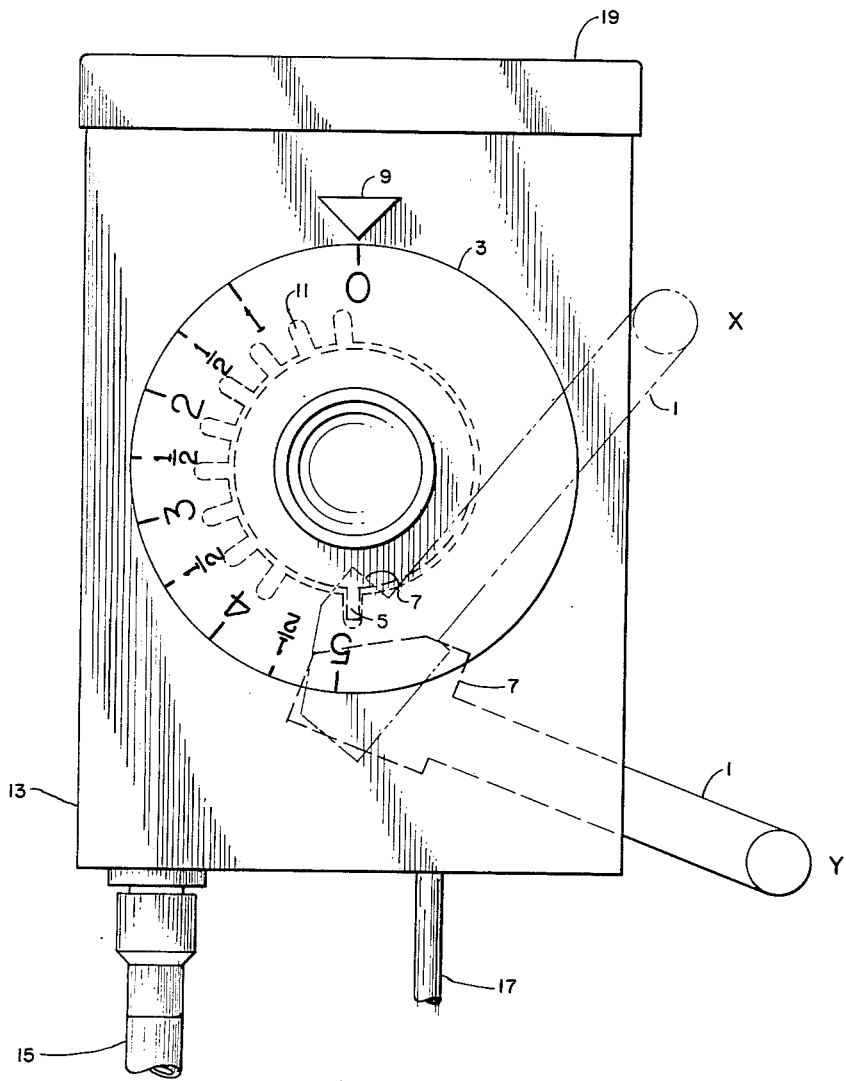
FIGURE 1 is a front view of a control device for liquid dispensers embodying the principles of the present invention.

Primarily our invention concerns a means of controlling, automatically, the delivery of gasoline from a conventional type dispenser in such a manner as to effect the delivery of any predetermined amount of fuel without the close attention of the operator.

There are now in use devices such as special automatic nozzles which will shut off delivery from a dispenser connected to a bulk supply into a tank or container when the liquid level in the said tank or container reaches a level where the delivery end of the said nozzle is submerged. These automatic nozzles have been developed into very useful devices and are widely used in the dispensing of gasoline and other fuels for internal combustion engines.

However, with the relatively high percentage of buyers asking for the delivery of a predetermined amount of fuel, generally based on the monetary value thereof, the automatic nozzle will not suffice, even though it still provides a safety factor to prevent overflow of the tank or container into which the fuel is delivered. This could be important where the buyer has overestimated the amount of fuel he needs to fill his container and where said buyer has asked for a predetermined amount. While the situation just described will likely arise from time to time, it has been found that generally the purchaser will buy less than the full capacity of the tank or container; indeed, frequently only a very small amount.

The need for a device which is simple, relatively inexpensive and yet reliable and which is capable of controlling accurately the delivery of fuel so that a substantially exact amount will be delivered without any manual attention by the operator during delivery, is apparent. Since the primary object of such an invention is to relieve the operator of the dispenser of the close attention to the detail of delivery so that said operator may be free to perform other tasks while delivery is effected, it also follows that any such device must be simple to operate and quickly set and, importantly, it must not impose on said operator any task, mental or physical, which would be required to operate the dispenser in an ordinary manner, manually, or as shown such a control device were not installed.

We have invented a device which fulfills the requirements outlined herein above. Within seconds the operator can preset the exact amount of fuel to be delivered and then operate the dispenser in the normal manner, leaving the nozzle unattended. When the predetermined amount of fuel has been delivered, the dispenser will stop delivery automatically. The indicators of amount of fuel and the value of said fuel will indicate exactly as normally in the dispenser. If after delivery of the predetermined amount it is found necessary or desirable to continue delivery, it is only necessary to proceed as if the control unit were not attached since it becomes inoperative after it has performed its function. There are no levers to move or other points needing attention by the operator; if it should be necessary to stop delivery of the fuel before the completion of delivery of the predetermined amount set on the control, it is done just as if the control unit were not attached since the control is driven by the indicator.

Obviously, even with a control capable of operating accurately it is also necessary to translate into action some other device, especially some type of valve, which performs the work of shutting off the flow of liquid fuel at precisely the correct time. Moreover, there must be some means of communication between the control unit and the valve through which means a signal or impulse can be carried with sufficient speed to insure the closing of the valve at exactly the proper time. Such means of communication, in order to be consistently dependable, should not contemplate the use of outside forces, other than electrical in special applications, but should be self contained. Our invention conforms to these requirements as will be seen from the description which follows.

In general, for reasons of safety, it is not desirable to use electricity in the control of fuel delivery due to the ever present danger of fire. There may be some particular situations where the use of electricity has great advantage, and we have provided for the control to operate electrical circuits where such an installation is necessary, using, of course, approved "explosion proof" switches and wiring therefor.

To understand the full nature of our invention, reference is made to the drawings.

Referring to FIGURES 1 through 6, our control unit is shown in approximately correct full size as it appears to the attendant. Let us consider first the principles upon which the device works. Since it must provide for stopping delivery of fuel at a precise moment which latter is determined by the advance of the counter or flow metering device in the regular dispenser, it is clear that the control must be perfectly synchronized with the operation of said counter. Suitable counter or flow metering devices are shown in U.S. Patents 2,874,875 and 2,814,444. This is accomplished by actually driving the control unit from the main shaft of the said counter or metering device by means of a flexible shaft 15. The control unit requires substantially no power to drive it and therefore does not impede the operation of the counter. Assuming, therefore, that the timing can be accomplished in a suitable manner, it now is necessary to provide a force which will be transmitted from the control unit to a mechanism designed to shut off the flow of fuel almost instantaneously in order that when the flow of fuel stops the counter will register the exact amount within very narrow limits. This is accomplished by providing for a quick pulse of air pressure which originates in a cylinder and piston assembly in the control unit, said piston being first cocked or pulled away from normal position against the force of a relatively strong spring and held in this position until the timing mechanism releases the piston to be driven by the spring, thus sending out an impulse of air at a pressure of substantially different value from that of the atmosphere. It might be a positive or negative pressure, as may be required by the valve mechanism, which serves to shut off the flow of the fuel. This air impulse travels to the controlled valve through a hollow tube 17 and said tube may be all or in part of flexible material.

The amount of fuel to be delivered at any one time is set by operation of dial 3 which is graduated in amounts in this case represented by the monetary value of the fuel delivered, as here in dollars and half dollars. Obviously, other values could be used or more divisions, but experience in service stations has shown that usually a customer buys in even amounts, possibly to simplify payment.

The dial 3 does not influence the start of delivery of the fuel as this latter is done in the normal manner. The dial 3 does, however, control the time of stopping the delivery when the control unit is in use. Therefore, it is imperative that there be always the impulse of air available for shutting off the delivery when the proper time comes. For this reason it is provided, as will be shown, that the dial can not be set until the lever or manual operator 1 is pulled downward from position X to position Y, by which action the piston is cocked ready to be released at the proper time and deliver the impulse to the controlled valve.

Figure 2:
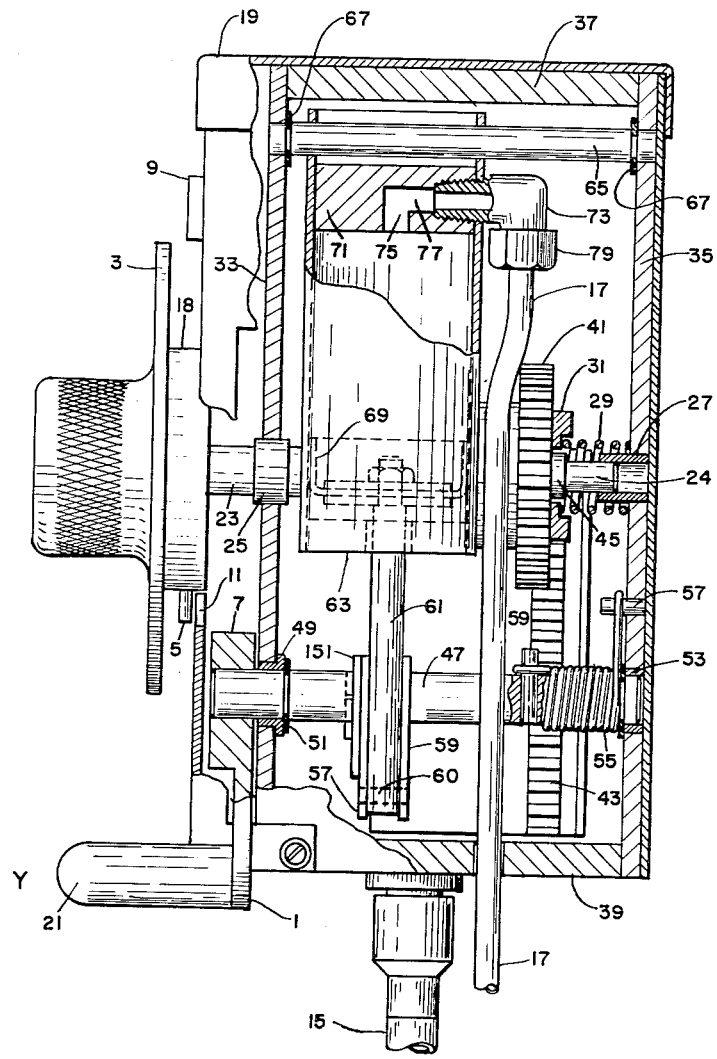
FIGURE 2 is a fragmentary partial sectional right side view of the control device shown in FIGURE 1 with some of the internal structures removed for clarity.

To operate the device, therefore, the attendant first pulls down the lever 1 from X to Y position where it is held until manually operated dial 3 is turned clockwise after first pushing said dial 3 inward toward the body of the unit and holding in the inward position while turning to set said dial 3 to indicate the desired amount under pointer 9, whereupon the push against the dial is released. This is done for several reasons, of which an important one is to assure proper registry of the amount. On the hub of dial 3, behind the face thereof, there is a pin 5 located as shown in FIGURES 1 and 2. The face plate 13 of the control unit is provided with a circular hole of sufficient diameter to permit the hub of the dial 3 to pass therethrough with ample clearance. However, the hub 18 of the dial 3 can not pass through the face plate 13 except in the exact locations of slots 11 located radially around the periphery of the hole into which the hub 18 of the dial 3 may be pushed. It is necessary that pin 5 be located opposite one of the slots in order to allow the dial 3 to retract to its normal position. Since the slots are located in substantially precise spacing as the graduations or indicia of the face of dial 3, it follows that when the dial 3 is turned to the approximate proper degree the pin 5 will pass through a slot 11, corresponding, and the control unit is set ready for fuel delivery. The use of the pin 5 and slots 11 greatly simplify setting the dial 3 since the pin 5 is round (cylindrical) in shape and tends to help the operator locate the proper place.

It should be noted that the entire system will remain inoperative until it is correctly set at one of the values on the face of the dial 5.

FIGURE 1 also shows cover 19 which is fitted over the entire assembly. The reason, mechanically, that dial 3 cannot be set until lever 1 is moved from position X to position Y is shown in FIGURE 1. Lever 1 is provided with an extension or shoulder 7 which obstructs the passage of hub 18 through hole in the face plate until the lever 1 is in position Y. Moreover, said lever 1 will not hold any intermediate position but must be fully advanced to position Y to permit proper setting of the device. Also, as will be shown hereinafter, the dial 3 cannot be turned in any amount unless and until it is pushed inward to the full and proper extent.

Figure 3:
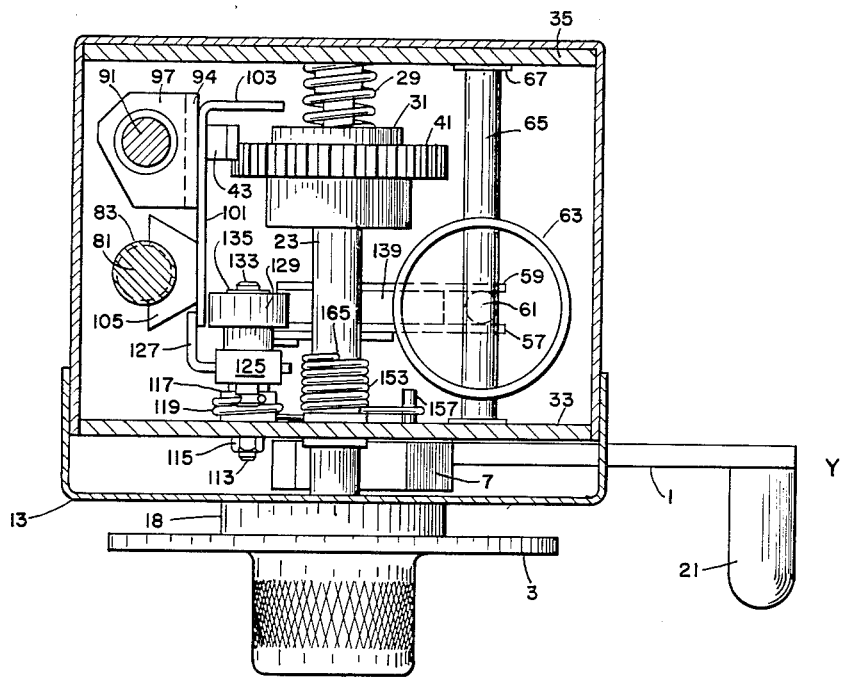
FIGURE 3 is a partial sectional top plan view of the device shown in FIGURES 1 and 2 with portions of the internal structures removed for clarity.

In FIGURE 3 we see that lever arm 1 is equipped with a convenient extension or handle 21. Now observe that dial 3 is attached rigidly to shaft 23 which passes through bearing 25, said bearing being mounted in the front plate 33 of the main case of the control unit. Shaft 23 also extends to the back of the case where said shaft 23 is provided with a shoulder 45 caused by a slight reduction in the diameter of shaft 23, said reduced diameter section being identified by 24 and the same is held in place by bearing 27 which latter is mounted in the back plate 35 of the controller unit case. Shaft 23 also passes through the center of gear 41 which is also rigidly held in position on shaft 23. Around the outside of the bearing 27 is a compression spring 29 held in some compression between the back plate 35 and the hub of gear 41. Gear 41 is in constant mesh with vertical rack 43 for reasons to be shown hereinafter. It will now be clear how the dial 3 is pushed against the thrust of spring 29 and the inward push or motion of the dial by the operator is limited by the contact of the shoulder 45 which contacts the bearing 27 when dial 3 has been pushed inward to the proper amount and so held while setting the values.

Lever 1 is firmly attached to a shaft 47 which passes through and is held in position by bearing 49 and ring 51 and said shaft 47 extends to a bearing 53 in the back plate 35 and is held in position thereby. Fastened around the part of shaft 47, nearest to the bearing 53 is a coil spring 55 of considerable force, said spring 55 held in tension between the ends thereof, one of which is fixed firmly to pin 57 in the back plate and the other similarly held by pin 59 in shaft 47. The drawing shows the spring in its wound-up or tightened position with lever 1 in the Y position.

Figure 4:
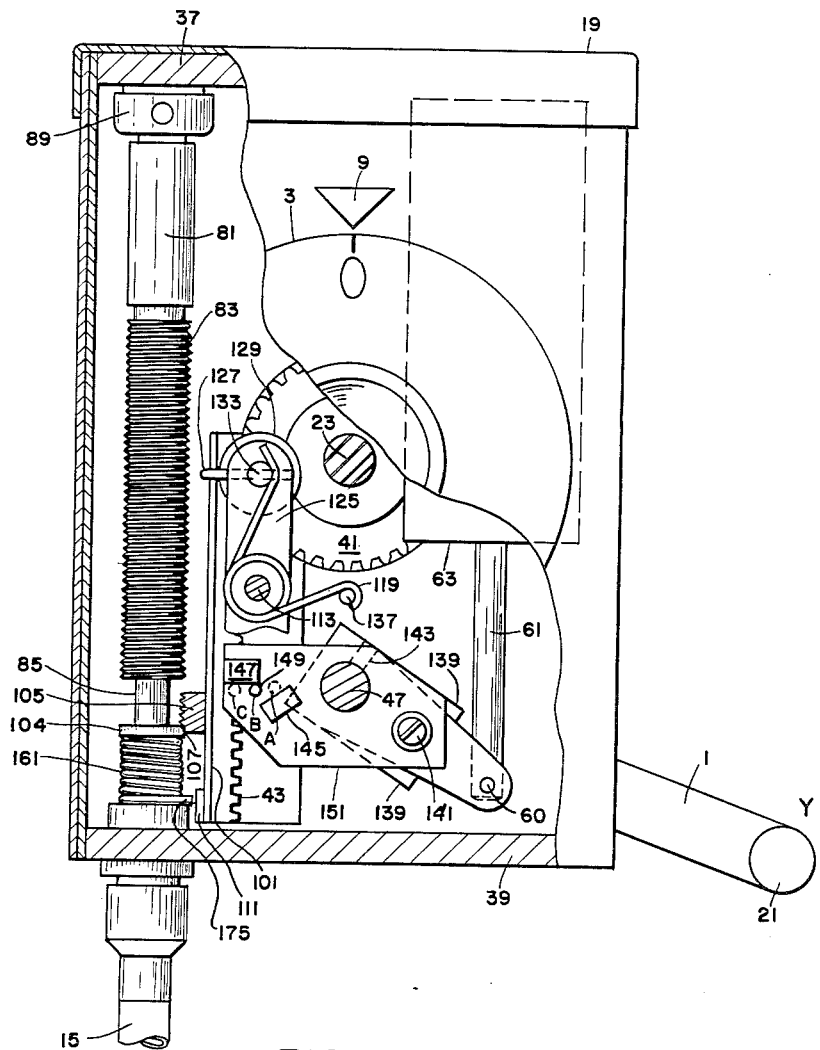
FIGURE 4 is a partial sectional front elevational view of the control device shown in FIGURES 1 through 3 with a portion of the internal structures removed for clarity.

Also rigidly fixed to shaft 47 are plates 57 and 59, better shown in FIGURES 2 and 3, which plates 57 and 59 act as a lever, being also pivotally attached to piston rod 61 by means of pin 60, FIGURE 4, which passes upward and downward with respect to cylinder 63, the latter being held with respect to the vertical by pin or shaft 65 which passes through the upper part of cylinder 63. Said pin or shaft 65 is held in position by fitting into holes in the front plate 33 and the back plate 35 with the aid of rings 67 on each end. In the drawing, the piston 69, shown in phantom, is in the down or cocked position. Near the top of cylinder 63 it is fitted with a rather thick plug 71 which tightly seals the head of cylinder 63. Into this cylinder 63 and through plug 71 is attached fitting 73 which receives the air impulse from cylinder 63 through prepared passageways 75 and 77. Said fitting receives tubular passageway 17 to which it is tightly affixed by nut 79. Now it can be seen that when the lever 1 is quickly released the force of the spring 55 causes the shaft 47 to rotate, forcing the piston rod 61 and piston 69 rapidly upward, thus sending an increased pressure out of cylinder 63 through fitting 73 and tube 17 toward the controlled valve and causes the latter to quickly close the fuel delivery line.

In FIGURE 3, showing a view in the horizontal plane, some of the parts on previous drawings are identified but new and additional parts appear. These shown at the left of the assembly cannot be clearly understood without considering also the drawing in FIGURE 4, which latter shows a view in a plane perpendicular to the axis of shaft 23. In these two views there is a vertical shaft or lead screw 81 with a substantial portion threaded 83 with a definite number of threads per inch which has a bearing on the divisions in the calibration of dial 3. Toward the bottom of shaft 81 there is a portion of reduced diameter 85. At the top of said shaft 81 is a collar 89 which can be used to adjust said shaft upwards or downward within certain limits for proper adjustment to the action of other parts. The shaft 81 is attached to flexible shaft 15 by a special means to be described hereinafter. The top of shaft 81 is held properly by a suitable bearing 177 (FIGURE 5) in top plate 37. There is also a stationary shaft 91 held in and between top plate 37 and bottom plate 39 by suitable rings 93. A metal bracket 95 with both top and bottom portions thereof 97 bent at right angles to the main part of bracket 95, said angle portions 97 thereof being on the same side of bracket 95. Said angle portions of the bracket 95 are equipped with suitable bearings 99 in both top and bottom angle portions 97, said bearings 99 being provided to permit said bracket to move freely up and down shaft 91 around which shaft 91 the bearings 99 fit. Since shaft 91 is round in cross-section, said bracket assembly can also rotate around shaft 91 within the limits available. Fastened rigidly, by any suitable means, to the bracket 95 is a vertical angle plate 101 (FIGURE 3) which extends the full length of the bracket, vertically. The short side 103 of the angle plate 101 extends toward shaft 23, parallel to the back of the case 35 a sufficient distance to terminate along a vertical line, said line being closer to shaft 23 than the outside periphery of the hub 31 of gear 41 and is so positioned that the hub 31 of gear 41 will thrust against the angle 103 of plate 101 when the dial 3 is pushed inward to effect the setting of the control mechanism.

Fastened along a vertical line and to plate 101 is a rack 43 which also extends the full length of said plate and which is so positioned as to always be in mesh with gear 41 in all possible positions of the latter. Also mounted on plate 101 as said plate extends frontward past the shaft 81 with its screw threaded section 83 is a section of a threaded nut 105 having threads to exactly match the threads 83 on shaft 81. Said threaded nut section 105 is mounted near the bottom of plate 101 and on the back face thereof in a position to fit into the threads 83 on shaft 81 when necessary. On the inside of said partial nut 105 and at the bottom thereof, as mounted, is a very small shoulder 107 which fits the curve or circumference of shaft 81 at the small flange 109 near the bottom and which flange 109 is a part of shaft 81. The length of the reduced diameter portion 85 of shaft 81 is of such a length that the threaded nut section can freely be positioned within the space without necessarily touching either the bottom of the threaded section 83 of shaft 81 or the flange section 109 of said shaft 81. At the bottom of plate 101 is a short vertical projection 111. The vertical edge of projection 111 toward the front of the control unit is substantially parallel to the axis of shaft 81 and along the center line of said shaft 81, said line running parallel to the front plate 33.

The position of plate 101 with respect to its possible rotation around shaft 91 (FIGURE 5) is constantly governed by its position between a fixed pin 127 and a roller 129, both of which can and do move together when necessary. This is best seen in comparing the drawings in FIGURES 3, 4 and 5.

Mounted on the front plate 33 at a predetermined and specific location there is a stud type bolt 113 (FIGURE 3), with shoulder 117 held by nut 115, on which is mounted in order (inward) a bearing 121 (FIGURE 5) and retainer 123. The bearing is provided to support part 125 which is in the shape of a rectangular parallelopiped and which extends as shown, above and below the place of support of bearing 121. Near the upper end of part 125, a pin 133 is fixed through part 125 and extends inward through a spacer collar 131 and roller 129 with retaining ring 135. The other end of pin 133 extends outwardly toward the front plate 33 sufficiently to form a post to support one end of coil spring 119. The other end of coil spring 119 which passes in coils around collar 117, is held by a suitable pin 137 in front plate 33. Spring 119 is kept in constant tension to a moderate degree. Roller 129 is held against the edge of plate 101 by the force of spring 119.

A curved pin 127, also suported by part 125, passes around behind plate 101 and is held fixed in close to said plate 101 at the line of tangential contact between roller 129 and plate 101 with only a small clearance between the plate 101 and pin 127. Curved pin 127 passes through part 125 on a line parallel to the face of part 125 and passes also through the larger pin 133, thus serving to hold the latter in position. The plates 57 and 59 (FIGURE 2), which are connected to the lower end of piston rod 61 are also rigidly fastened to a relatively thick block 139 (FIGURE 3) which has a thickness of about the same value as the diameter of piston rod 61. Said block 139 is provided with a hole through which shaft 47 (FIGURE 2) passes and to which shaft block 139 is rigidly fastened by means of set screw 143 (FIGURE 4) and therefore rotates therewith.

Figure 5:
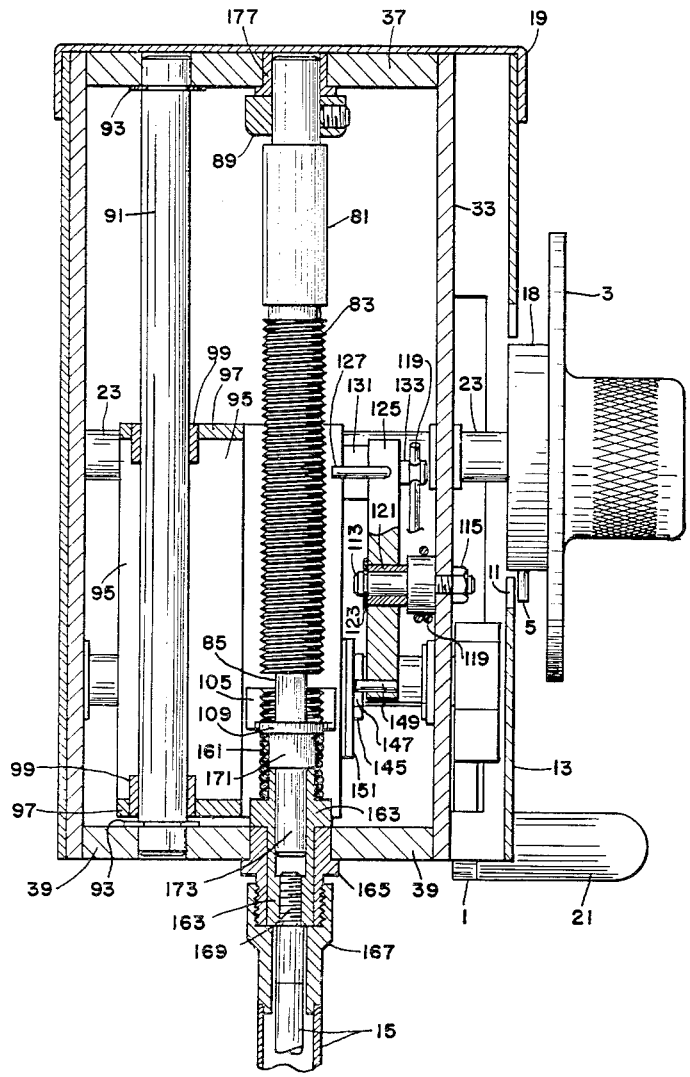
FIGURE 5 is a partial sectional left side elevational view of the device shown in FIGURES 1 through 4 with a portion of the internal structures removed for clarity.

In addition to the plates 57 and 59 there is also another plate 151 (FIGURE 2) fastened to the outside of plate 57 through which shaft 47 also passes. Said plate 151, shown in drawings in FIGURES 2, 4 and 5, is provided with metal projections 145 and 147 as shown. Plates 151, 57 and 59, together with block 139 form an assembly which is held together with screw 141 (FIGURE 4) and fit on the common shaft 47 to which shaft 47 the assembly is held in its proper position by means of a set screw 143.

Part 125 shown in part sectional view in FIG. 5, is shown in FIG. 4 in its side view, only downward to a section just above plate 151. Actually the lower part 125 has a pin 149 mounted therein, which pin projects outward toward plate 151, as shown in FIG. 5. This pin is moved from position A to position B, FIG. 4, by the movement of plate 151 with its projections 145 and 147 when shaft 47 is rotated by moving lever 1 from position X to position Y (FIGURE 1).

In FIGURE 4 three different positions which pin 149 will occupy during the operation of the control unit are indicated by the letters A, B and C. When lever 1 is pulled downward from position X to position Y, it actually travels beyond position Y for a short distance during which motion plate 151 with angle projection 145 moves upward enough to contact pin 149 in position A, said pin 149 being urged toward position B by the angle of the projection 145. When lever 1 is released it will remain in the Y position since the projection 147 on plate 151 now will be held by pin 149 in position B, as shown in FIGURE 4. When pin 149 is in position B, its movement from position A to position B causes the curved pin 127 and roller 129 to move in the opposite direction just enough to cause plate 101 with nut section 105 attached to move away from the reduced section 85 of shaft 81 sufficiently to permit nut section 105 to drop downward and catch the shoulder 107 of said nut section 105 on the larger diameter part 109 of shaft 81. When plate 101 with attached nut section 105 is moved farther away from shaft 81 by pushing inward on dial 3 for setting, as described hereinbefore, the pin 149 will occupy position C with respect to plate 151.

When the nut section 105 travels downward and drops into the space afforded by the reduced diameter part 85 of shaft 81, plate 101 moves toward shaft 81 followed by roller 129 which causes pin 149 to return to position A, thus releasing plate 151.

Before we get further it might be helpful to know the functions and reasons for the parts we have so far identified. The timing mechanism is based on the movement of the threaded nut section 105 along the threaded screw section of shaft 81. Since screw 81 is driven from the counter indicator or metering device through flexible shaft 15, it would normally rotate when fuel is delivered and if nut section 105 were held in close contact with screw section 83, the distance said nut section 105 would travel would be proportional to the amount of fuel indicated on the counter.

Now let us follow the action of setting the mechanism by the operator or attendant. The first thing to do is pull down lever 1 from X to Y, the limit of travel. This rotates shaft 47, causing angled projection 145 to contact pin 149, pushing said pin 149 from position A, FIGURE 4, to position B. Since pin 149 is attached to and substantially a part of lever 125 and said pin moves in an arc around center fixed pin 113, the movement of said pin from position A to position B causes plate 101 to rotate slightly counterclockwise, FIGURE 3, around fixed shaft 91, said motion being produced by the movement of pin 127, which is mounted on the top of arm 125, opposite the location of pin 149. This slight movement of plate 101 with the attached nut section 105 is sufficient to permit said nut section 105 to drop by force of spring 153 to the position shown in FIGURES 4 and 5, where the shoulder 107 of nut section 105 now rests on the part 109 of shaft 81. This position of nut section 105 causes pin 149 to remain in position B, thus holding lever 1 in position Y since now the projection 147 of plate 151 is above pin 149 which it can not pass in position B. This provides for cocking the lever 1 and holding it in place, as described above. Now the operator, in order to set the device for the amount of fuel to be delivered, must push dial 3 inward, toward the back of the case, in order to turn the dial. When the dial 3 is so pushed inward it moves the position of gear 41 (FIGURE 2) with its hub 31 against angle plate 103 (FIGURE 3) while the said gear 41 is still in mesh with vertical rack 43. The movement of gear hub 31 against angle plate 103 now moves nut section 105 away from shaft 81 and the threaded section 83 thereof, so that the position of said nut section with respect to the shaft 81 can be changed. Since gear 41 is fixed to shaft 23, as is also dial 3, moving the dial 3 in a clockwise direction causes gear 41 to raise the plate assembly 95, 97, 101, 103 and 105. This is because rack 43, in constant mesh with gear 41, is attached firmly to plate 101 and the entire assembly moves upward along the shaft 91. When the operator (attendant) releases the dial 3 the plate assembly containing nut section 105 moves clockwise (FIGURE 3) permitting roller 129 to be held in firm contact with plate 101 which in turn holds nut section 105 firmly in contact and in mesh with screw section 83 on shaft 81.

Now, if we can assume that the screw section 83 of shaft 81 is always maintained in substantially the same position, when the dial is to be set, with respect to its rotation it can be assumed that screw section 83 makes a predetermined number of turns in moving the nut section 105 downward to the point of release at the end of the threads 85.

In order to compensate for wear to some extent and to avoid "play" or loose motion in the travel of the nut section along screw section 83, we have a coil spring 153 fastened to shaft 23 at 165 and with the other end of spring 153 held by pin 157 in plate 33. The action of this spring provides a steady downward thrust to nut section 105 holding same in smooth contact with the threads of section 83 of shaft 81. When the nut section reaches the end of the threaded portion 83 of shaft 81, said nut section 105 drops into the recessed portion 85 of shaft 81, thus permitting roller 129 to move toward shaft 81— to the left in FIGURES 3 and 4—thus causing pin 149 to move from position C, where it was during the travel of the nut section 105 to position A, and thus releasing lever 1 with the plate and block assembly 57, 59, 139, 145, 147 and 151, all of which being firmly attached to shaft 47. The force provided by coil spring 55, FIGURE 2, thereupon drives piston 69 through piston rod 61 rapidly upward, thus compressing the air in the cylinder above piston 69 and sending this increased pressure out from the cylinder 63, through 75, 77, 73, and 79 and through tubular conduit 17 to the controlled valve, which latter shuts off at once the flow of fuel.

It is obvious that the dropping of the nut section 105 into the space along the shaft at 85 must be exactly synchronized with the counter indicator. The actual net distance the nut section must travel before dropping into engagement with lead screw 81 is the controlling factor. In order to make each setting exactly the same in this regard it is necessary that the screw section 83 of shaft 81 stop with the same face toward the nut section 105 and so remain until the next setting. Otherwise the setting could be off by as much as one full thread in vertical distance (±½ thread). This is accomplished by the novel arrangement shown in FIGURE 5.

The cover of flexible shaft 15 is fitted with a screw connection 167 which is held by threads to special stud 165 which latter is firmly held in place in bottom plate 39. The end of the rotating part of the flexible shaft assembly 15 is provided with screw threads 169. A long special bearing 163 is held firmly attached by matching screw threads 169 to flexible shaft 15 (FIGURE 5). Thus when flexible shaft 15 turns, said bearing 163 also turns inside stud 165. Shaft 81 is provided with a section of reduced diameter 171 for a relatively short distance of its length and with a further reduction in diameter 173, below 171. No part of shaft 81 is in contact with flexible shaft 15.

The upper portion of special bearing 163 has an outside diameter substantially the same as the diameter of the section 171 of shaft 81, and said special bearing 163 has an inside diameter only slightly larger than that of section 173 of shaft 81, providing for the free turning of bearing 163 with respect to shaft section 173. Since the outside diameters of shaft section 171 and the mating part of bearing 163 are substantially the same, said parts 171 and 163 are provided with a spring clutch 161 so constructed as to cause shaft section 171, and therefore all parts of shaft 81, to turn in complete synchronism with bearing 163 and therefore flexible shaft 15. This will be the case as long as the spring clutch 161 firmly holds both parts 171 and 163 by its snubbing action. However, as is well known, the gripping action of clutch 161 can be released by simply loosening the spring coils in clutch 161. The actual amount of movement to accomplish this release is extremely small.

When the shafts are turning in synchronism the spring clutch section 161 also turns therewith. Said spring clutch 161 at its lower end terminates with a slight extension at the last coil 175, FIGURE 4, said extension being just sufficient to strike projection 111 on plate 101 when said projection is close enough to said spring coil extension 175. This latter situation occurs only when the nut section 105 has reached the end of its travel along the threaded section 83 of the shaft 81, and is thrust in toward the shaft section 85.

By proper timing of the device this situation will occur so that the nut section 105 will reach the end of travel on the lead screw at substantially the same time that the extended end of spring clutch coil 175 is in position to strike projection 111, said action releasing the spring clutch 161 and thus stopping the rotation of shaft 81. If the fuel dispenser is operated in normal manner without the controller described, shaft 81 will remain at rest in the proper position for the next setting, when it is again needed.

Proper calibration is provided by adjustment of the position of shaft 81 and its threaded section 83 by correct positioning of the thrust collar 89 at the top of shaft 81, said thrust collar providing thrust against bearing 177 in top plate 37. By the procedures and apparatus described hereinabove the invention operates with astonishing accuracy and it is not necessary to adjust the device after each operation.

Now, let us assume that we have established that we can produce an air impulse or closed contacts in an electrical circuit, we must now consider the necessary connections and devices required to accomplish the desired result in keeping with the timing of our control device.

While we have not mentioned hitherto, or described such a control device, which is intended to operate an electric apparatus, it should be clear to those familiar with the subject matter that the substitution of electric switches to be operated from the same control device as that which operates an air piston and cylinder assembly would not offer any particularly difficult problem insofar as the controlling unit itself is concerned. More will be disclosed on this subject hereinbelow.

It has been stated that the control unit is operated from and by the main shaft, or any other shaft which operates in synchronous manner with the counter indicator, by means of the flexible shaft between the control mechanism and a suitable drive connection therefor at the counter indicator.

Figure 6:
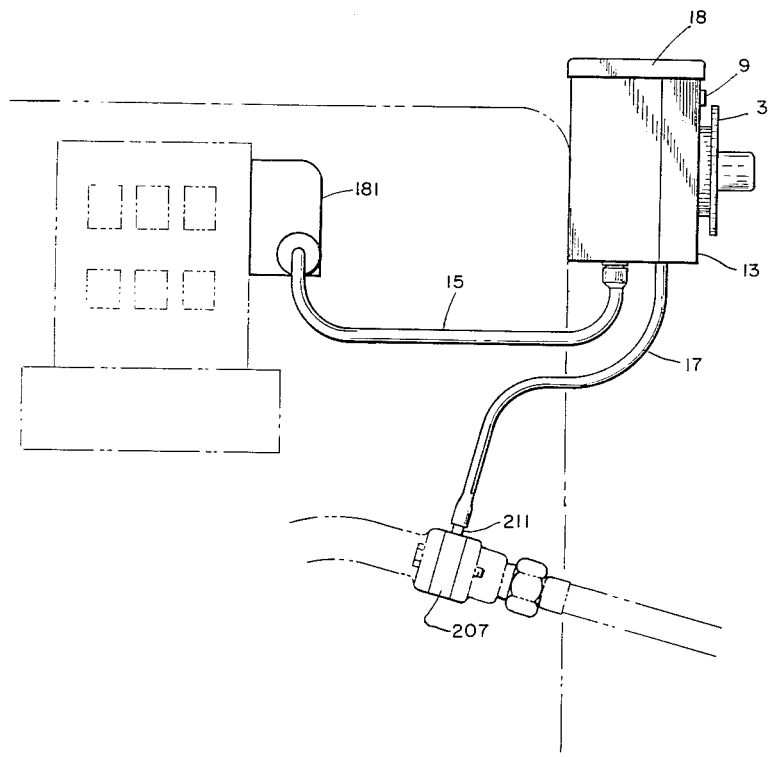
FIGURE 6 is a fragmentary elevational view showing the device of the present invention attached to a fuel dispensing unit.
Figure 7:
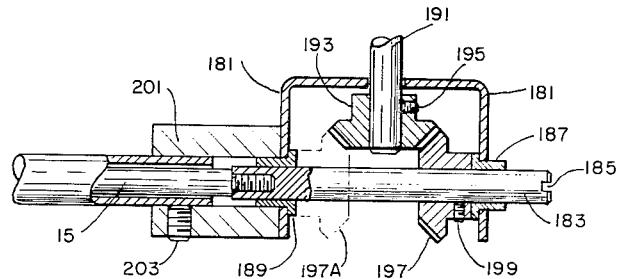
FIGURE 7 is a fragmentary horizontal sectional view of a portion of the drive means connecting the control device shown in FIGURES 1 through 5 to the computer mechanism of a fuel dispensing unit.
Figure 8:
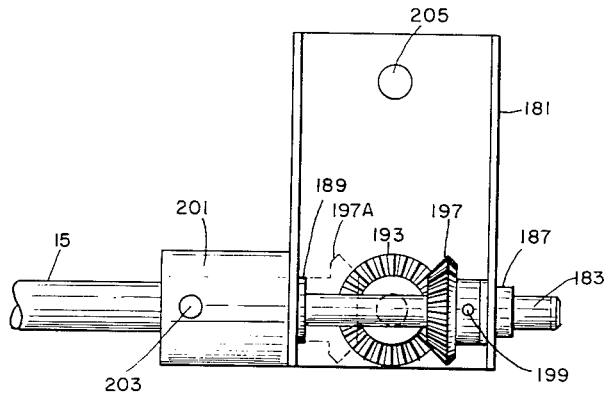
FIGURE 8 is a vertical elevational view of the structure shown in FIGURE 7.

FIGURE 6 shows more or less diagrammatically how flexible shaft 15 extends from the control unit to the shaft driving mechanism in housing 181, the details of which latter are clearly shown in FIGURES 7 and 8. It should be understood, of course, that we use a flexible shaft because of its ease of attachment in a variety of locations and positions. However, any other method of providing for the synchronous rotation of the bearing 163 with the counter indicator would be acceptable.

Figure 10:
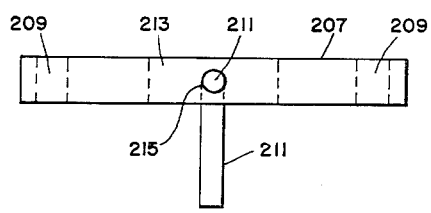
FIGURE 10 is a side elevational view of the structures shown in FIGURE 9.
Figure 9:
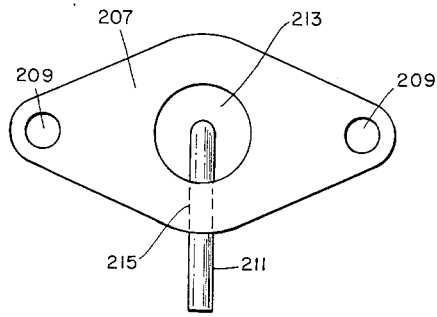
FIGURE 9 is a plan view of a coupling structure employed in the present invention.
Figure 11:
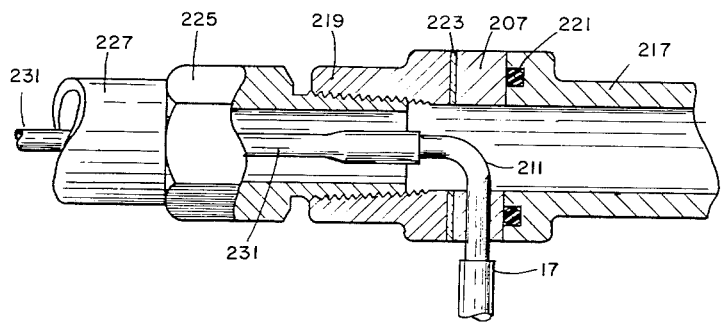
FIGURE 11 is a fragmentary sectional view of the structure illustrated in FIGURES 9 and 10 inserted in a fuel dispensing conduit.
Figure 13:
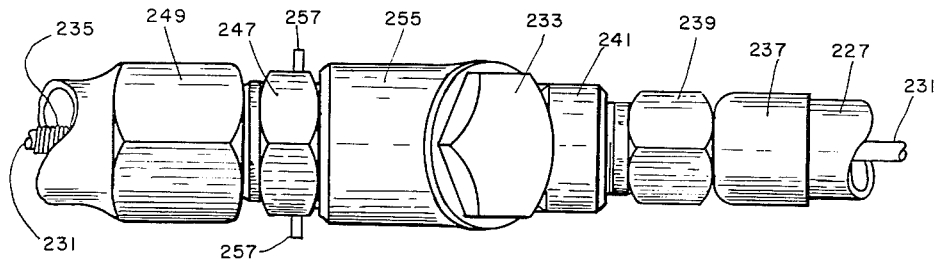
FIGURE 13 is a top plan view of the device shown in FIGURE 12.

In FIGURE 6 we also see the air line 17 from the control unit to an adapter flange 207, better illustrated by drawings in FIGURES 9, 10 and 11, said adapter flange 207 generally being located within the case of the dispenser. This adapter flange is provided to permit the controlling air line to be completely housed within the flexible hose line and thus protected from likely damage in service. The air line is thus incorporated in the fuel hose line whenever the point of control or location of the controlled valve is on the flexible hose line. As will be shown hereinafter other methods should be equally satisfactory where control is effected by a suitable valve arrangement installed in the fuel line preceding the connection thereof to the flexible hose line.

FIGURES 7 and 8 show a means of providing connection of the flexible shaft 15 to the shaft of the counter indicator. It is generally desirable to make the connection to the counter indicator which registers the monetary value of the fuel delivered, since the amount required by the purchaser usually specifies the amount desired in terms of money. However, obviously our invention should be equally useful in controlling actual volume of liquids in terms of gallons, liters, etc., in which case connection would likely be made to the shaft of the counter indicator which registered such.

In the drawings, FIGURE 7 shows the connections in a horizontal plane. Main shaft of the counter indicator 191 generally extends outside the case as shown with the housing 181 being fastened tightly to the frame or case of the counter indicator. The hole 205 in FIGURE 8 is provided to receive a screw and nut usually found in this relative position on the standard computer counter indicators. Upon the extension of shaft 191 is mounted bevel gear 193 held in position by suitable set screw 195. A mating bevel gear 197 properly meshed with bevel gear 193 is on short shaft section 183 and held in position thereon by suitable set screw 199. Shaft 183 is supported properly by flanged bearings 187 and 189 which latter are mounted in the side plates of housing 181. One end of shaft section 183 is drilled and tapped with threads to match the threads on the end of flexible shaft 15. A short cylindrical piece 201 which is provided with a hole therethrough longitudinally of proper inside diameter to fit around bearing 189 and the housing of flexible shaft 15 is firmly attached to the housing plate 181 as shown, by any suitable means. Said cylindrical piece 201 is provided with a set screw 203 as shown to secure the housing of the flexible shaft 15. Since the end of flexible shaft 15 is provided with threads for connection, the shaft section 183 is attached to flexible shaft 15 by use of screw driver in the slot 185 which permits turning shaft section 183 thus effecting the screw connections between 15 and 183.

Ordinarily it would be possible to connect the flexible shafts directly to the shaft 191 but due to various difference between makes and styles of dispensers the method shown in FIGURES 7 and 8 seem preferable. Also shaft 191 does not always turn in the same direction in all dispensers. However, it is necessary that the flexible shafts always turn in the same direction. Should the indicator shaft 191 turn in the opposite direction it is only necessary to reverse the position of mating bevel gear 197 to the opposite side as shown in phantom 197A. The gear arrangement described also can be used to vary the relative speed of the shafts should this be necessary.

We have found that we can control the closing of the valve in the nozzle at the end of the hose line by providing a suitable air conduit to such nozzle. When nozzles of the automatic type, such as those disclosed in patents No. 2,582,195 to Duerr, No. 2,759,768 to Payne, and Buckeye-Oraco No. 2,320,033, are used as a regular part of the dispenser equipment we can provide for the automatic closing of such nozzles by suitable connection to our control unit.

For example, we have operated our control unit with one of the popular nozzles of the automatic type, specifically one disclosed in Patent No. 2,582,195, as will be shown hereinafter. To operate the controls extent in such an automatic nozzle it is usually necessary to lead a suitable air conduit through, or past a swivel connection which permits the nozzle to be operated in almost any position. Such a swivel connection is described in Patent No. 2,745,682.

In order to effect closing of a valve in the nozzle naturally there must be an air line from the control unit to said nozzle. Since we have found that an air line of sufficient size to operate satisfactorily need not be of large diameter, but is so small as to be capable of being inserted in the fuel line without adversely affecting the flow of said fuel, it appears feasible to incorporate said air line inside the fuel line.

It is very desirable to have the air line in the fuel line, as has been noted, for protection of said air line and for improved appearance. To effect proper installation of the air line inside the flexible hose line and inside a swivel connection, as well as inside the nozzle itself, is quite difficult to conceive but not difficult to accomplish when the method is determined. It is imperative that such an air line be flexible and be guarded from construction distortions or other abnormal distortions. Since the hose line generally connects to the metal pipe lines in the vicinity of the meter by means of screw threads, it is necessary that a means be provided for connecting the air line independently and in such a manner that the said air line will not be twisted during installation. As a satisfactory means of doing this we refer to the drawings, FIGURES 9, 10 and 11.

FIGURE 9 shows a plan view of a suitable connection which is essentially a flat flange with a curved tube (rigid) entering through the side thereof.

FIGURE 10 is a side elevation of a suitable flat flange 207 which may be any shape to fit the matching flange of the dispenser, provided with two bolt holes 209, said bolt holes provided to match those in the flange in the dispenser to which it is to be attached. The center of said flange has a circular hole 213 therethrough of substantially the same inside diameter as that of the pipe line in the dispenser which leads to said flange. In one side of said flange 207 a copper tube 211 is inserted through a suitable hole 215 provided therefor, and said copper tube is sealed by any suitable means to prevent leakage of fuel and to hold said tube 211 in a substantially fixed position, the portion of said tube which extends inside flange 207 being curved so that the inside extension of tube 211 has a terminal section at right angle to the plane of flange 207, FIGURE 11. When tube 17 is connected to the outer end of curved tube section 211 it is now possible to lead the air into the pipeline without twisting or otherwise damaging the flexible tube installed in the hose line. In the drawing, FIGURE 11, there is another view of flange 207 and the tube 211 therewith also indicates the method of attachment. (See also FIGURE 6.)

In FIGURE 11, if there were no flange 207 or tube 211 to install, the dispenser fuel line would be as follows: stationary metal line (pipe) 217 would be connected to flanged part 219 with a suitable O-ring or gasket, said metal pipe being also fitted with a flanged end to match the part 219 with which it is held in tight contact with suitable bolts through holes in the rims of the flanges.

Part 217 has a cylindrical opening of substantially the same inside diameter as the pipe line through which the fuel flows. Part 219 has a cylindrical extension larger than the pipe diameter and is fitted with female threads in such diameter that the male threaded metal end of the hose can be screwed in tightly, said hose fitting 225 being manufactured to contain the end of hose 227 without danger of leakage. Since hose 217 fits tightly to threaded connector 225 it is necessary to turn hose and nut together in order to tighten threads 229 sufficiently. Obviously, to avoid twisting the hose, the flanged part 217 is tightened to the part 219 which is easily done and the two flanged parts are bolted together. To avoid twisting the air line 231 inside the hose line 227 the tight connection between 219 and 225 is completed after which the air line is drawn through the hose line for more than its full length and an end at the flange assembly is allowed to protrude somewhat for the purpose of fitting said air line 231 over copper tube 211 and fastening it thereto by any suitable means.

Now, since flanged part 207 will fit the connections, said part 307 is installed between the other two flanges without difficulty, being fitted with a suitable gasket 223 between said flange 207 and flanged part 219. The other side of said flange, also flat, fits against the O-ring seal 221 in flanged pipe connections 217. Any slack in the air line 231 is taken up from the other end of the hose.

Of course, reference to use of copper tube for 211 is by way of example, since tubes of other materials may be suitable.

On its way through the hose the air line must now pass through the swivel joint previously described. While not every nozzle has a swivel connection, there are so many in use that we must assume its presence. Practically any material used for the flexible air line would fold or collapse in passing over the edges of the elbows and perhaps other very short turns, unless measures were taken to prevent such occurrence. A popular type of such swivel connector is illustrated in the drawings in FIGURES 12, 13, 14 and 15.

Figure 12:
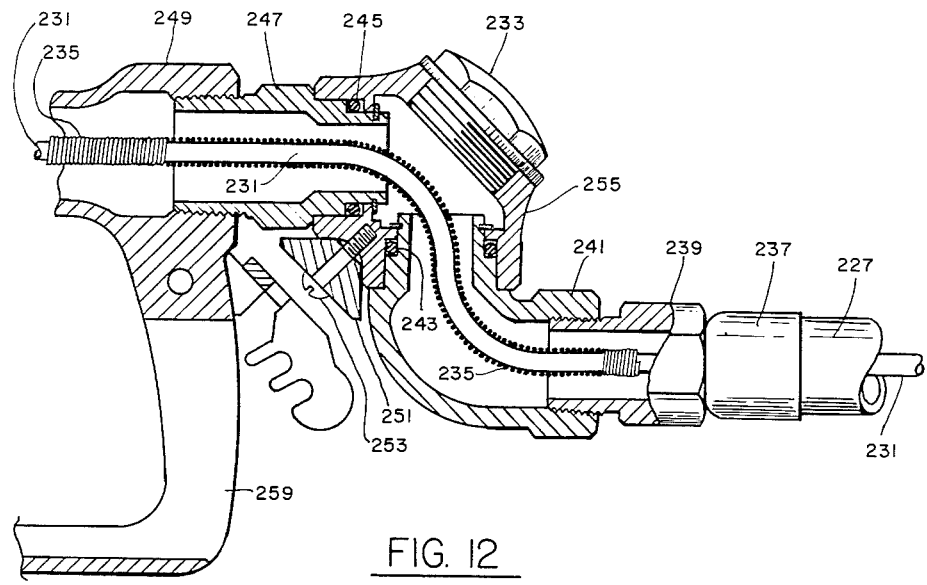
FIGURE 12 is a fragmentary sectional view of a swivel connected to a portion of a dispensing nozzle such as shown in FIGURE 15.
Figure 15:
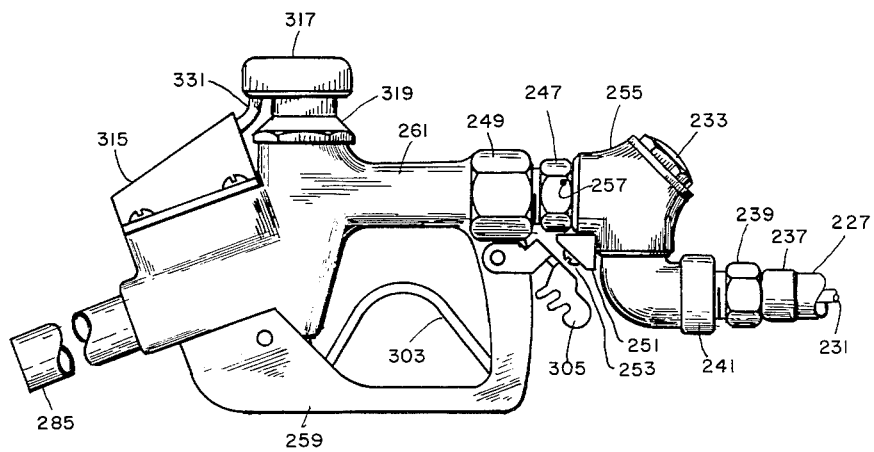
FIGURE 15 is a view similar to that shown in FIGURE 14 modified to include the automatic control means of the present invention.

FIGURE 12 is a part sectional drawing showing the general construction of such a connector. In order to pass around or be pressed against rather sharp corners and still not fold or collapse but retain a substantially circular cross-section, flexible air line 231 is fairly tightly covered with a suitable armor, in this case a coil spring was used, said spring 235 having its coils without spacing between them. Spring 235 fits tightly around flexible air line 231 but not sufficiently tightly to promote distortion by so doing. The entire length of flexible air line through the swivel connector and all other similar turns is armored with the spring covering.

Air line 231 in hose 227 becomes armored as it passes into the hose connector 239. It is then threaded through the swivel connector by first removing screw cap 233 from the connector 255, then threading the armored air line first through the opening formerly covered by screw cap 233 and then rethreading through the remaining passage and out through part 247 after which the screw cap 233 is replaced.

The swivel connector 255 may now be turned to screw onto the male fitting at the hose end. By holding the armored end, the air line will not twist when the connector is turned (rotated around the end of the hose).

Since air line 231 or armored part thereof 235 must finally be fastened to some terminal connection, it follows that the swivel connector must be limited in its freedom to rotate or turn 360°, over and over. Some limitation will not decrease the usefulness of a swivel connector to any measureable degree if we can retain the principal virtues of the device, even though limited. This was done and the results are completely satisfactory.

FIGURE 12 shows a triangular piece of metal 251 fastened to the underside of the swivel 255 by means of screw 253. Said screw 253 is not permitted to penetrate the inside of the space for the fuel passage. In connecting screw with hexagon nut end 247 are installed two pins 257 each opposite the other, FIGURES 13 and 15. These pins limit the motions of the swivel to the arc (over 180°) between said pins 257.

The limit of motion of the other part of the connector 241 is provided by the handle 259 of the nozzle assembly. The action of the swivel connector within the limits provided by these additions does not apparently detract from its utility. The armored air line now enters the nozzle proper through the hexagon back part 249.

Before proceeding further we should briefly describe the mechanism in an automatic nozzle which mechanism has a bearing on this application of our control system. We have chosen as a model the nozzle described in Patent No. 2,582,195, to L. H. Duerr and dated January 8, 1952. Our drawings are not concerned with the method of operation of the main parts and valve of this nozzle but only those parts which trigger its action, thus causing it to instantly shut off the fuel flow. We also wish to show that we do not change the operation of the automatic valve as it was intended to function.

Figure 14:
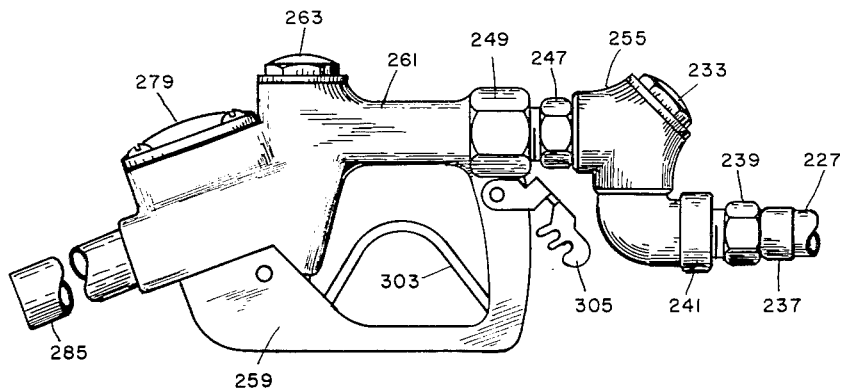
FIGURE 14 is a side view of a conventional dispensing nozzle and swivel.
Figure 16:
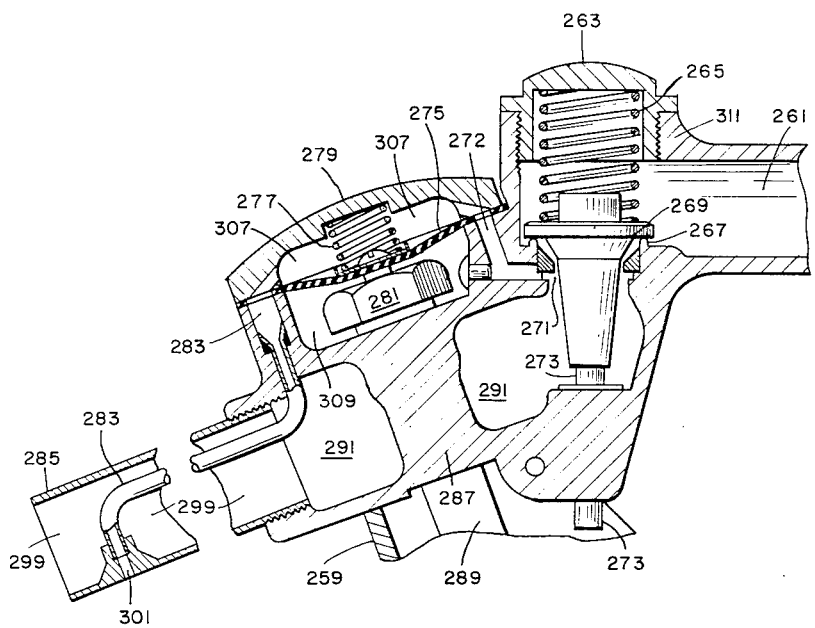
FIGURE 16 is an enlarged fragmentary sectional view of a portion of the flow control nozzle shown in FIGURE 14.

Reference is now made to the drawings in FIGURES 14 and 16. FIGURE 14 is a side view of the automatic nozzle with tip and as now used, with addition of our control. FIGURE 16 is a part sectional view of that portion of the said automatic nozzle with which we are concerned.

In normal operation any amount of fuel may be delivered through the nozzle by manually holding open the valve 269 by means of the handle 303. However, the nozzle is designed to shut off the flow of fuel instantly when the tank or container into which the fuel is being discharged becomes substantially full. The action is completely automatic. The principle of operation is as follows:

After starting the dispenser motor and inserting the spout 285 into the container to be filled full, the valve 269 is raised from its seat 267 by raising lever arm 303 and the said arm 303 is manually caught in one of the notches of retainer clip 305 which latter is kept normally open and away from the end of the lever 303 by spring action. When it is required to hold the lever 303 the friction due to the downward thrust of lever handle 303 is sufficient to hold the clip 305 in place. However, with any release of the pressure exerted against clip 305 by lever arm 303, said clip quickly moves away by the force of its own spring (not shown).

The nozzle is provided with a passageway 261 for the fuel which then passes through valve 269 thence through chamber 291 and on out through the spout 299. Valve 269 is always manually opened but frequently automatically closed, as will be shown. As the fuel passes through the valve 269 it acts as a modified venturi, tending to create a partial vacuum. At the point where the partial vacuum is formed by venturi action at 271 an air passage 272 is provided which leads into an upper chamber 307, above diaphragm 275 and under cap 279. Also connected to the same chamber is another air passageway 283 which continues inside the spout of the nozzle and out through an opening 301 in the spout of the nozzle, and the side thereof, a short distance back of the end of said spout 299.

Nut 281 houses a mechanism which will release the part 289, permitting it to drop down instantaneously. Since lever 303 is connected to this part 289 by a pin and since said part 289 must remain locked in trigger fashion, in the up position in order to allow the lever arm to thrust pin 273 upward, thus opening valve 269. Whenever part 289 is allowed to drop quickly the clip 305 is released and the valve 269 closes by pressure of spring 265.

Should there be a vacuum or partial vacuum in the chamber 307 above diaphragm 275 said diaphragm would be drawn upward against the small pressure of coil spring 277 and this action would release the mechanism in and below nut 281, thus causing the nozzle to shut off the fuel delivery. A partial vacuum is not generated in chamber 307 while the fuel flows freely from the spout of the delivery nozzle since any partial vacuum is relieved by the passage or flow of air into the opening 301 in the side of the spout 285. However, when the fuel in the receiving tank rises enough to cover the opening 301 then with air excluded from chamber 307 a partial vacuum does quickly develop in chamber 307 causing the mechanism to shut off the fuel, as described.

Since the partial vacuum is created in chamber 307 by interference with passage of air through 283, 307 and 272 and thus causes the valve to be closed, it is only necessary that we provide for obstructing said air passages 283, 307 and 272 by a suitable device which will be operated by the air pressure from the control unit. Since our device can be attached to existing equipment it is a little more difficult than to provide for the same in the design of the nozzle itself. In the drawings FIGURE 15 and FIGURE 17 the changes are indicated and it would be well to compare these drawings with FIGURE 16. Insofar as the original nozzle is concerned, the only changes are that covers 263 and 279 have been replaced.

In order for the air line to reach the area where the control of closing the valve is accomplished said air line must pass through the chamber which normally contains spring 265. Due to the action of said spring 265 it was necessary to raise said spring and provide a cylindrical section 337' with a slot 338 therein, through which slot the air line 231 with its armor 235 could pass freely and not interfere with the spring action. Therefore, part 337' acts as a spacer between the valve part 269 and the spring 265. An additional housing 319 was provided for spring 265 in its new raised location.

Cover 263 was replaced by special cap 317 which is provided with a center inside extension 335 to receive the armored air line 231–235. Said cap 317 is also provided with an air passageway 333 from the connection 335 to an opening hole 341 under the edge of said cap 317, said hole being for the purpose of providing a tubular connection with adjacent cover 315.

Substituting for cap 279 we have attached cover 315 which provides a chamber 307 as before and also has mating holes and air passageways as with cap 279. However, in cover 315 we have made a small cylindrical cavity 323 which runs almost the full length of the cover 315 and in which is installed a solid relatively short piston 325 which is held in a position at the upper end of 323 by coiled compression spring 321. Both spring and piston are held in place by set screw 327. The space partially occupied by spring 321 is connected by air tube 337 to passageway 283. Said space 323 is also connected by air tube 339 to chamber 307, and air tube 345 is provided also from chamber 307 to connect with passage 272. The cover is so made that all parts, screw holes and air tubes fit over the corresponding parts below it and to which it is fastened.

In operation an impulse of air at increased pressure passes through air line 231, opening 335, air tube 333, tube connection 331, air tube 329 into the upper end of cylindrical hole 323 and forces piston 325 against spring 321, thus causing piston 325 to compress spring 321 to a sufficient distance so that the piston will cover the opening 339 or both 339 and 337. This prevents the passage of air from 301 via 283, 337, 323 and 339, into chamber 307 and results in creating a partial vacuum therein, which raises the diaphragm 275 releasing part 289 which in turn releases lever 303 and results in quick closing of the valve 269.

It can be seen that by modification of the details of construction of substantially any nozzle of the automatic type the control unit hereinbefore described can be made to control such automatic valves without substantially changing their original function or design. Our control equipment can be easily removed and the original caps returned, leaving the nozzle exactly as it was before.

There are still very many dispensers of fuel which do not use automatic nozzles. For an ordinary, simple, manually operated nozzle, as well as for the safety type nozzles, we have devised a relatively simple method of utilizing our control unit for the delivery of a predetermined amount of fuel. For nonautomatic nozzles it would seem, perhaps, somewhat hazardous to use any method of attempting the delivery of a predetermined amount as in some instances the receiving tank or container might not have the empty (unfilled) capacity to hold the expected amount. In such a case the receiver would overfill with resulting spillage and consequent danger. However, much will depend on the type of application.

Figure 18:
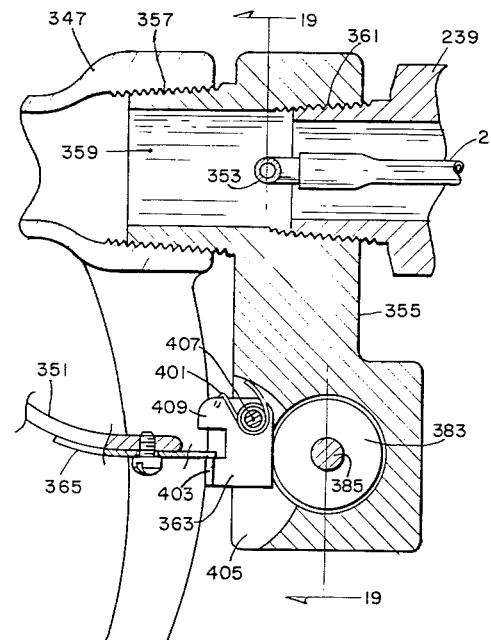
FIGURE 18 is a fragmentary sectional view on line 18—18 of FIGURE 19 of a dispensing nozzle modified to include the principles of the present invention.
Figure 19:
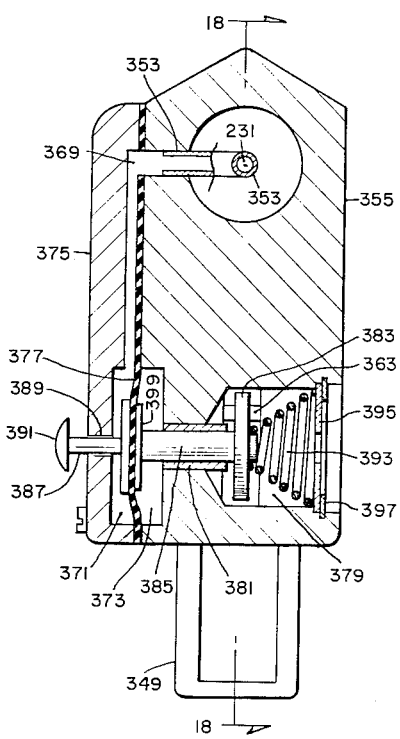
FIGURE 19 is a sectional view substantially on line 19—19 of FIGURE 18.
Figure 24:
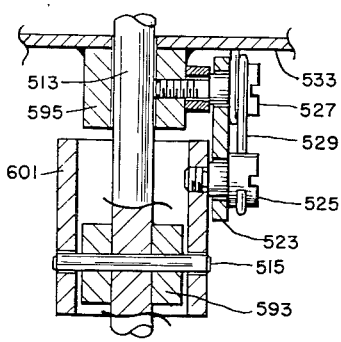
FIGURE 24 is a fragmentary partial sectional view substantially on line 24—24 of FIGURE 21.

In any event a very acceptable alternate method of using our invention with automatic nozzles or any make, without any special provision for the special features of the specific nozzles, is illustrated in FIGURES 18 and 19. These two drawings are intended to represent a single attachment which will fit between any standard hose connection and any standard nozzle as an insertion.

FIGURE 18 is a part sectional drawing of the attachment with the section taken along line 18—18 of FIGURE 19, and FIGURE 19 is a part sectional drawing taken along lines 19—19 of FIGURE 18.

In FIGURE 18 a solid body 355 is provided with a threaded extension 357, the threads of which match in all respects the female threads in the base of the nozzle 347 of a standard nozzle. Inside the threaded extension 357 is a hole 359 with its axis the same as that of the threaded part and an inside diameter, generally the same as that of the flexible fuel conduit from the dispenser meter assembly. The end of this hole opposite the threaded projection 357 is tapped with threads 361 substantially identical with the female threads in the nozzle 347. These female threads 361 will therefore receive the matching threads of a standard hose connector 239.

The body of the attachment extends downward along the back of the handle or trigger guard, as shown, and a spring equipped latch 363 is provided to engage the handle or lever 351 which is used to open the nozzle valve and start the delivery of fuel. An extension 365 for said lever 351 is fastened thereto by one or more screws 367 or any other suitable means. The side of hole or passage 359 is drilled to receive a rigid tube section, which is curved or bent at a right angle inside said hole 359 and rigidly fastened in the side hole by any suitable means, with the inside angle end directed toward the incoming fuel line. With this rigid tube 353 in place, it is also joined in a suitable manner to flexible air line 231.

Face plate 375 fits tightly on one side, left in the drawing, FIGURE 19, said face plate 375 being provided with a groove 369 forming an air passageway leading downward from the end of tube 353 to a cylindrical chamber 371. Plate 375 and body 355 are held together by suitable screws or bolts, with proper gasket between the faces thereof. The cylindrical chamber near the bottom is divided into two parts by a diaphragm 377, itself fitted with discs on both faces thereof to which rods and/or shaft sections can be attached.

Cylindrical chamber 373 is connected with a cavity 379 drilled or bored inward from the opposite face, said cavity 379 being concentric with the cylindrical chamber and of a diameter slightly smaller than that of cylindrical chamber 373. Inside the cavity 379 is a relatively thick disc 383 which is firmly attached to a short shaft or pin 385 which latter is also rigidly connected to the discs 399 of the diaphragm 377. Pin 385 is supported by a bearing 381 which extends between the two chambers. Pin 385 is made with a reduced diameter as it passes through the discs 399 and diaphragm 377, and this reduced diameter section 387 extends through the plate 375 and is capped on the outer end by a button 391, used to facilitate pushing said pin 387 and all connected therewith. Pin 387 in passing through plate 375 is lightly sealed to prevent or reduce air leaks by suitable packing 389, the latter designed to provide the minimum friction.

At the end of the pin assembly opposite the button 391 a coil spring 393 is held in the cylindrical cavity 379 by washer 395 and retaining ring 397, said spring being retained under low tension but enough to hold the pin 385 and diaphragm in the position shown in the drawing.

On the face of the body 355, semicircular slot 405 is cut to receive latch 363 with spring 401, both of which are held in position by pin 407. Latch 363 is made with a small angle part 403 on the bottom portion thereof which engages and holds lever 351, 365 and therefore maintains the delivery valve open when in this position, when fuel is flowing through the nozzle. While said latch 363 can and does rotate in a short arc around pin 407, it is prevented from so doing when in service since disc 383 is behind it and prevents its rotation. When disc 383 is thrust in a direction away from chamber 373, it moves from behind latch 363, thus withdrawing support therefor with the result that latch 363 rotates counterclockwise (as shown in FIGURE 18), thus releasing lever extension 365 and therefore lever 351.

Disc 383 is constantly urged toward a position behind latch 363 by the force of spring 393. When said disc is moved from position of support for latch 363, the latter swings counterclockwise until angle portion thereof 403 strikes the face of the main body 355, being held in this position until the lever 351 is set again. When lever 351 is again raised to begin discharge of fuel, the extension part 365 of said lever contacts the upper part 409 of latch 363 and further upward movement results in the latch remaining there since disc 383 is permitted to move behind latch 363 by the action described.

While the action described can take place by the manual pressing of the button 391, the sequence can also proceed by action of the diaphragm. When the air line carries its pressure wave through flexible tube 231 through 353, 369 and into chamber 371, the total pressure on diaphragm 377 overcomes the pressure exerted by spring 393 and the friction of pin and disc assembly.

It is also possible and sometimes desirable to effect control of the delivery of fuel by providing a valve to shut off delivery of fuel at a point near the meter and usually in the main housing for the meter, counter, computer, and pump assembly. This can be accomplished by the use of our air line method from our control unit or, if desired, by electrical means. It is to be understood that some gasoline dispensers have a submerged pump which is not contained in the housing. The location of the supply pump has no relation to the control unit of this invention. Both methods are shown hereinafter.

In order to maintain a full fuel line to the nozzle at all times, which is standard practice, it is necessary when the control shut off valve is remote from the nozzle, to provide a relief valve mechanism in the nozzle body. In fact, the use of such a relief valve is desirable in substantially all installations. The object of this relief valve is to provide a relatively small back pressure on the fuel when it is flowing, said back pressure being substantially less than the normal pressure in the fuel line as provided by the pump. For example, the pump will, or can ordinarily, provide a fuel pressure of about 20 pounds per square inch and such pressure is maintained. If a relief valve, which operates somewhat like a safety valve, is in the nozzle and is set to relieve at, say 5 pounds per square inch, there remains a difference of about 15 p.s.i., which is ample for the satisfactory operation of the dispenser. When the fuel line is shut off, even in a remote position, by the valve provided therefor, the fuel will cease to flow due to the closing of the relief valve. The latter closes because with no more fuel passing through the line the pressure therein quickly drops to less than 5 p.s.i.

Figure 20:
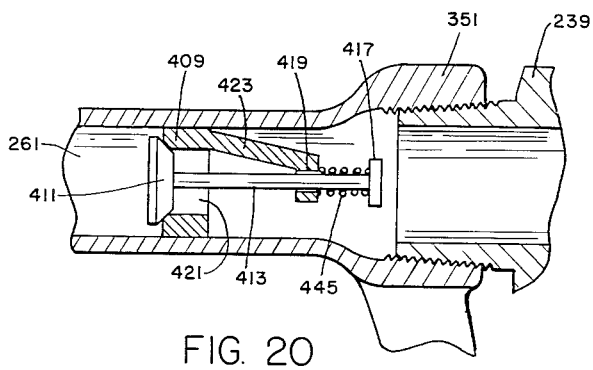
FIGURE 20 is a fragmentary sectional view of a pressure actuated flow control device which may be employed in conjunction with the control means of the present invention.

Such a valve is illustrated in FIGURE 20, installed in the nozzle just inside the place of the connection of the hose line to the back of the nozzle. In the drawing, for illustration only, hose connector 239 is screwed into nozzle 351 as shown. In the barrel or fuel line 261 of the threaded portion 351 of the nozzle is pressed or otherwise affixed, a valve seat 409 with an extension thereof 423 toward the inlet of the fuel at the end of which there is a small hole 419 in a line parallel to the fuel flow. The valve seat on the face thereof, toward the discharge of the fuel, is a suitable valve 411 capable of completely closing the port 421 or opening in said valve seat 409. Said valve part 411 is rigidly fastened to valve stem 413 which latter passes through hole 419 in the extension 423 through a spring 445 and terminating with a button end 417 or the like, which latter is provided to contain the said spring 445 between it and the top of valve seat extension 423.

The valve seat extension 423 is so constructed as to provide comparatively little obstruction to the fuel flow. As long as the pressure in the fuel line behind valve 411 is less than its predetermined limit, say 5 p.s.i., the fuel will be contained in the line behind said valve, but when the pump pressure is opened into the fuel line the higher pressure overcomes the back pressure set on valve 411 whereupon it opens and permits the fuel to flow.

By the use of a suitable valve of this type, the fuel shut-off valve can be located in a suitable remote position.

In the application of the control from the control unit described herein on a section of the fuel line to some extent, at least, remote from the nozzle and therefore the place of discharge into the buyer's container, we have designed a suitable integral valve assembly which can be installed at any convenient location, but preferably at the place where the flanged connection is made between the metal pipe leading from the meter and the metal hose connector. This is the same location as that mentioned with respect to the part described in FIGURES 9, 10 and 11. This mechanism is illustrated by the drawings in FIGURES 21, 22, 23 and 24.

Naturally, in keeping with our main objectives, it is necessary that this valve mechanism be operable without any attention from the attendant or operator. Therefore, it is necessary that such a valve be normally in a position to permit delivery of fuel in the normal manner with no interference whatever attributable to the control attachments described in this application. In all other methods described herein, this requirement was always met by the very nature of the control, all being directed to the one valve in a nozzle. In this last mentioned situation, we will have two valves in tandem relation each to the other. One of these is the valve in the nozzle and the other is the automatic shut-off valve in the line behind the nozzle.

The drawings are intended to illustrate proper controls to provide freedom of operating with or without automatic, predetermined quantity shut-off and as hereinbefore set forth.

Figure 21:
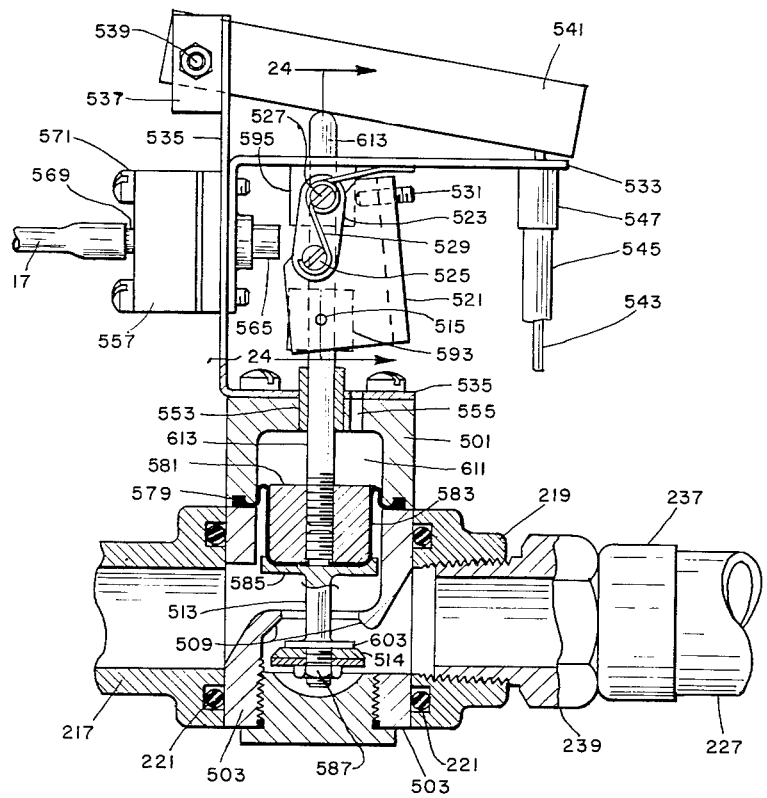
FIGURE 21 is a fragmentary partial sectional view of a modified form of flow control valve interconnected with the control device of the present invention.

In FIGURES 21 and 22, the metal pipe line 217 from the dispenser meter is terminated in a flanged end for coupling to a like flanged part 219 which latter carries provision for the screw connection of hose pipe line 227 through nut 239. The control valve described herein is designed to be inserted between the two flanged parts 217 and 219.

The body of the valve proper 503 with the upper part thereof 501 is generally of conventional construction, especially with regard to the working parts thereof. The outside shape of said valve body 503, 501 is substantially square in horizontal cross-section with straight, smooth sides. Two of the sides opposite each other, however, extend mutually parallel in the form of flanges 505 (FIGURE 23) with provision for bolts 507 at each end thereof, or the said extension could be of solid construction as a part of the body of the valve 503, intended to match the size and location of holes for similar bolts in said flanges 217 and 219. The flanged-shaped extensions are solid and form a part of the valve body.

With further reference to the drawings, the flanged-shaped extension of the valve body 503 is bolted between flanges 217 on the metal pipe line from the meter and 219 which receives the screw connection for the hose, by means of suitable bolts or screws 507.

Inside the valve body there is provided a valve seat 509. A mating valve disc 511 (FIGURE 22) is held in position by valve stem 513 with shoulder disc 603 and nut 587 on the lower threaded end thereof. The upper end of stem 513 is threaded to fit into mating threads at the lower end of piston 581 and a flanged disc 585 which covers the lower end of piston 581. Into the upper part or end of piston 581 there are threads which receive rod 613, said piston 581 being otherwise of solid construction and said piston 581 holds rods 513 and 613 in substantially a straight line. Rod 613 extends upward out of the valve body 501 through bearing 553 above which, on said rod 613, is mounted a square solid block 593 which is held in position on rod 613 by means of pin 515. Spaced above said block 593 is a stationary block 595 welded, or otherwise tightly held, to angle plate 533 through which block 595 the rod 613 passes, and extends above plate 533 as shown, and for reasons hereinafter disclosed.

Upper part 501 of valve body 503, being square outside, is held firmly to the main body 503 by suitable screws 577 with beaded flange 579 or other suitable seal between the parts. The two flanged connections to the fuel line 217 and 219 are also provided with O-ring seals 221 or other suitable materials.

Piston 581 is larger in diameter than the main valve part and therefore said piston 581 would tend to exert a greater pressure upward with the flow of fuel than the opposite acting valve 511 and therefore when fuel flows under pressure the valve assembly tends to close, and if not hindered, will do so.

The chamber 611, in which piston 581 is located, is larger than the piston 581 to provide for an extensible diaphragm 583, which is held in place by the beaded, ringed flanged part thereof 579. In the top of the valve body part 501 there is provided an air escape vent 555 to permit air to escape from chamber 611, thus avoiding buildup of back pressure.

Affixed to the top of valve part 501 by screws 577 is an angle plate 535 which extends upward as shown and provides a mount for a diaphragm 559 (FIGURE 22) and associated parts. The said diaphragm 559 is installed between two square blocks 557 and 561, the insides of which are bored with a circular hole of the proper diameter to accommodate said diaphragm 559. The section adjacent to plate 535 being fairly shallow (though not necessarily so) houses a coil spring 563 around a pin 565 which latter is held tightly to the center of said diaphragm 559 by means of a washer and screw 575 or any other suitable means. The upper chamber 609 is connected by a tube extension 569 with a suitable hole longitudinally therethrough and to this said tube extension 569 is attached air line 17 from the control unit. Angle plate 533 is fastened to the face of angle plate 535 by any suitable means and extends downward along the face of plate 535 from the point or line of contact at least as far as a line horizontal and even with the bottom of the described diaphragm total assembly and housing last delineated. A pierced hole 567 in plate 533 is located in such a position that pin 565 which extends inward through plate 535 also passes some distance through pierced hole 567.

At the top of plate 535, as better shown in FIGURE 23, an opening is cut downward and the parts of the plate so displaced are bent back at right angles to receive a channel 541 which latter is held in position at this end by a suitable bolt 539 passing through the flanged parts 537 and channel 541. The location of the channel 541 is such that it is directly over and in contact with rod 613.

The outer or opposite end of channel 541 has connected thereto, by any suitable means, a flexible wire 543 provided with a housing 545, commonly used in industry for machine control. In this case, the said flexible wire 543 passes through a small hole in the channel 541 and is fastened to a button or disc 549 at the top end. A coil spring 551 maintains constant tension on wire 543 which latter is also suitably connected with the regular controls of the dispenser.

To block 593 and rod 613 is also fastened by common pin 515 a channel section 521 in such a manner that channel 521 is permitted to swing around pin 515 within the limits afforded. Fastened on the outside of flange 601 on either one or both sides, the drawings show only one, is a clip 523 of substantial thickness, held rotatably by a screw 525 to channel part 601 with the opposite end of said clip 523 similarly fastened to stationary block 595 by screw 527 with the axis of said screw 527 perpendicular to and intersecting the axis of rod 613, and parallel to the axis of pin 515. Provision is made around the heads of screws 525 and 527 to retain a special spring 529 of the coil type, one end of which being held by screw 525 and after one or more turns around screw 527, the other end is contained under plate 533, the spring so wound and installed as to urge the clip 523 to turn around screw 527 in a clockwise direction as shown in FIGURES 21 and 22.

In operation, the valve assembly is normally in the position indicated in FIGURE 21 since the act of stopping the dispenser is arranged to pull the control flexible wire 543 until channel section 541 is in the position shown in FIGURE 21. At this time the channel 541 has pushed rod 613 down enough to permit spring 529 to swing clip 523 and channel part 521 into a position of having the supporting points in substantially a straight line, but with screw 525 slightly past center. While in this position, the valve below will be open and remain open. The degree to which screw 525 may pass the center line is determined by set screw 531 near the top of channel part 521.

When fuel is delivered by starting the dispenser in the usual manner, the channel 541, acting as a lever, returns to the position shown in FIGURE 22, but the parts, clip 523, channel part 521 and rod 613, remain as shown in FIGURE 21.

As long as the dispenser is operated without the use of the control unit for fixed amount delivery, the valve herein described will remain open and the parts 521, 523 and 613 will remain in the position shown in FIGURE 21. However, when it is desired to deliver a predetermined amount of fuel by the use of our control unit, the control unit is operated and set as fully described hereinbefore. When the control unit sends the air pulse through tube 17, it enters chamber 609, thus pushing against diaphragm 559 and spring 563, driving pin 565 toward the swivel connected parts 523 and 521, striking near screw 525, thus thrusting same past the center line, whereupon the parts involved quickly take the position shown in FIGURE 22, thus closing the control valve below. The air pressure in chamber 609 is very soon relieved and the spring 563, diaphragm 559 and pin 565 return to their normal position.

There are many advantages inherent in control by use of electrical devices where such may be adequately housed and so located as to avoid danger of fire or explosion. We have designed suitable means of using our control unit, without any change in construction thereof other than the substitution of means for control of electric current instead of providing air pressure impulses. The timing and major operating parts of the control unit are not changed as will be seen in the description of the methods herein described. Since it is essential to have all electric wire conductors adequately protected from possible damage, we prefer to have the valve, which shuts off the flow of fuel, located in the housing with the pump and meter and in the rigid pipe line from said meter and ahead of the place of attachment of the flexible hose line.

For this purpose we prefer a solenoid operated valve. Such a valve is reliable and can be had to operate normally open or normally closed. Since substantially all dispensers now operate without any positive valve in the line except in the nozzle, the use of a normally open valve would seem to be satisfactory.

In FIGURES 25 and 26 we illustrate how a normally open solenoid valve can be used with our control unit operating said valve instead of controlling fuel delivery by other means.

In the drawing, FIGURE 25, the source of electric power is represented in conventional manner and identified "Line." All dispensers have suitable switches which serve to start and stop the motor-driven pump, and such a switch 625 drives motor pump unit 627. A suitable solenoid type normally open valve 629 is provided in the pump housing (not shown).

A double pole double throw switch 631 of small size having a spring-loaded button 633 provided for its operation is mounted by any suitable means in the control unit in such a manner that the said button 633 will be in a position behind plate 101 and sufficiently close thereto to cause the switch to become operative when plate 101 has been moved away from screw 83 when dial 3 is pushed inward as in setting for air pressure lines. Since plate 101 remains in substantially this same position with respect to the axis of screw 83 during the travel of the nut section 105 down the screw 83, the contact with the button 633 of the switch 631 will be held with sufficient force to keep the switch connections in abnormal position until the nut section 105 reaches the reduced diameter section 85 of shaft 81 whereupon the said nut section 105 moves into the space provided by the reduced diameter section 85 of the shaft 81 and at the same time plate 101 to which nut section 105 is firmly attached moves away from switch 631, relieving the pressure on button 633, thus permitting the internal spring in switch 631 to bring the contacts to their normal position. FIGURE 26 shows the contacts of switch 631, diagrammatically, in their normal position, and the dash line shows the switch in the opposite position.

Mounted at some suitable place, either in the pump housing or remote therefrom, is a double pole magnetic relay 635 with its solenoid 637. Normally this relay is open as shown. A spring-loaded normally closed single pole, single throw switch 639 is provided in the circuit to the control unit for a purpose hereinafter described.

In operation, the dial 3 of the control unit is pushed inward as described hereinbefore and turned to indicate the desired amount of fuel to be delivered. When the said dial 3 is pushed inward, this causes plate 101 to bear against the button 633 of switch 631, which operates the switch to make contact between 1 and 4, FIGURE 26, and break contact between 2 and 3. The current then passes through switch 631 and on to solenoid 637 of relay 635 thus closing the contacts in said relay 635. The current then passes through the relay connections to 1 and 3 in the control unit. Since the circuit is broken in switch 631, valve 629 which is normally open, remains so until the predetermined amount of fuel has been delivered. When delivery is completed, the contacts in switch 631 return to their normal position, as shown in FIGURE 26. The relay 635 closed contacts will remain closed as long as the current passes through the solenoid 637 and this will be the case even after the control unit has shut off the solenoid valve 629.

Since it is necessary to cause the electric current to flow through the solenoid valve to close it, this must happen exactly at the time the delivery of fuel has been completed as predetermined by the setting on the control unit. The circuit during fuel delivery is as follows: from Line, through 625, 639, 1, 4, P, Y, O, X, 3. A parallel current which feeds P in the relay 635 also passes through solenoid 637 and continues to do so even though the other circuit is broken at 3.

When delivery is complete, the switch 631 returns to normal connections as shown in FIGURE 26, thus breaking connection at 1 and 4 and making connection at 2 and 3. Breaking connection at 1 and 4 does not affect relay 635 after it has been closed and now the connection through 3 and 2 to the solenoid valve 629 is complete and the said valve 629 closes. With the connections as described, the valve 629 will remain closed until opened by action of the operator of the dispenser. If the operator wishes to continue delivery of fuel beyond the amount previously set on the control unit, the operator can open the valve 629 by simply pushing a spring-loaded button on switch 639, thus momentarily breaking the circuit to the relay 635, which then opens and valve 629 stays open for any regular delivery of fuel. Of course, the valve 629 will be reopened also whenever the main switch 625 is opened as it is after complete delivery of fuel either with or without the use of our control unit.

Figure 27:
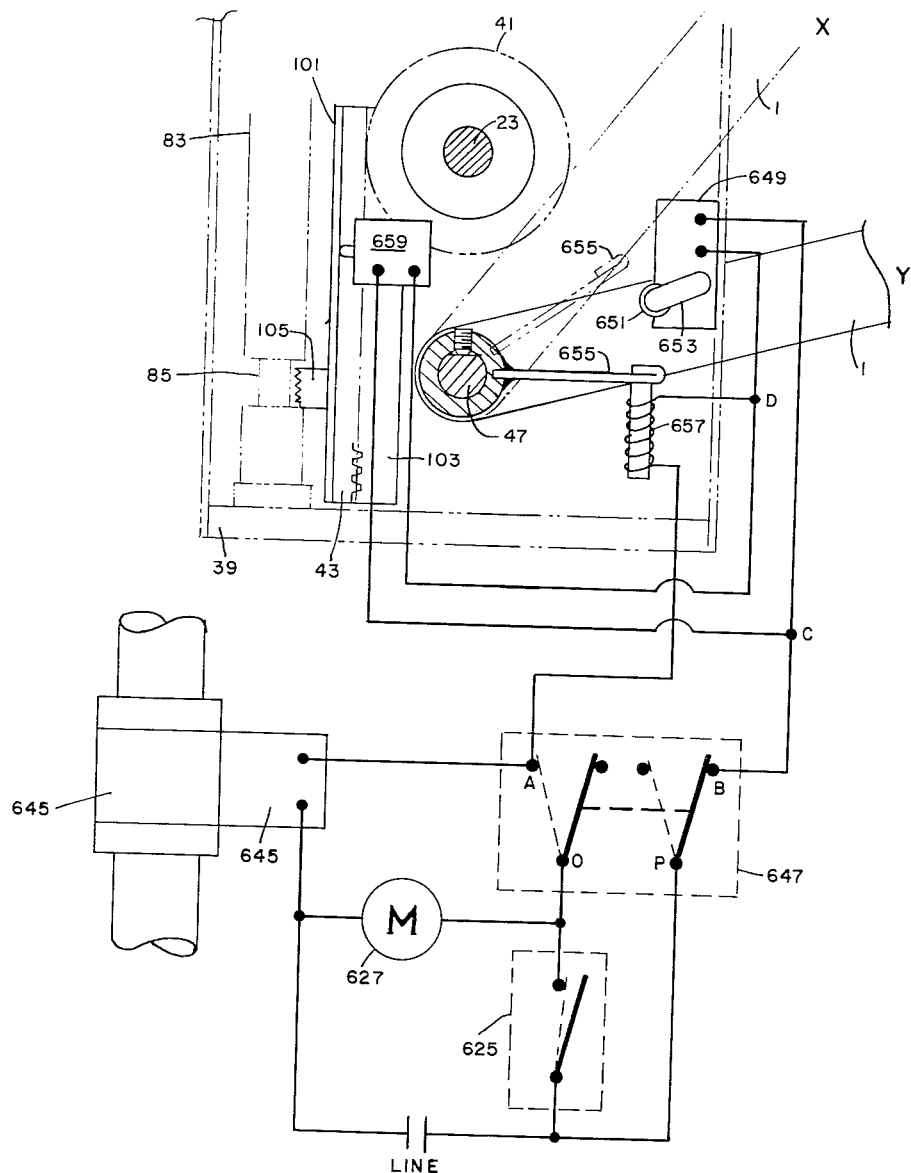
FIGURE 27 is a diagrammatical representation of a further form of electrical control means for the control device for liquid dispensers embodying the principles of the present invention.

A safer control can be provided by the electrical design shown in diagram in FIGURE 27 wherein we show a conventional electric current power supply line with main connection through switch 625 as is presently a part of substantially all dispensers, there being no change therein required. This main switch controls the current to operate the electric motor driven pump 627.

A suitable normally closed solenoid operated valve 645 is installed in the rigid fuel line as described hereinbefore for the design illustrated in FIGURE 25. Since the solenoid valve 645 remains normally closed at all times unless opened by an electric current passing through said valve 645, there is an element of safety we believe important.

If fuel is to be delivered in the normal manner, as without the use of any control unit, a manually operated double pole, double throw type switch 647 which remains in the desired position, is thrown to the left, as illustrated, thus breaking contact PB with the control unit, and making contact OA through the solenoid switch 645, which is thus opened and fuel delivery may proceed as in any other dispenser.

When switch 647 is thrown to the right, thus making contact PB and breaking contact OA, the circuit must be completed through the control unit.

Mounted, as shown, on the inside of one part of the control unit case, the right side as one faces the front thereof, a time delay single pole, single throw switch 649 is mounted with a roller 651 on extended operating arm 653. The lever 1, FIGURE 1, is fastened to shaft 47 as in other installations, and can be moved from position X to position Y, as before. Also fastened to shaft 47 by any suitable means, is a bar 655 of such a length in such a position that when lever 1 is pulled down from position X to position Y said arm 655 comes in contact with roller 651 on switch arm 653 causing it to move downward and thus close the switch contacts, completing the circuit for a predetermined time period. When lever 1 is moved to position Y, passing and energizing switch 649, a temporary current passes through solenoid 657 and in parallel circuit to switch 659 which is mounted behind plate 101 and made operable by the movement of said plate 101 as with the switch 631 described in the device shown in FIGURE 25. Switch 659 is a spring-loaded, single pole, single throw type and is energized by setting the dial 3 as in the case of the switch in FIGURE 25. Since switch 659 is connected in parallel circuit with switch 649, current through the solenoid 657 is maintained if the dial is pushed inward for setting the amount of fuel to be delivered before the time delay switch 649 breaks the circuit automatically. If the circuit is broken by the time delay switch 649 before the dial 3 of the control unit is pushed inward for setting, the lever 1 will return from position Y to position X and the operation must be repeated since dial 3 cannot be set unless lever 1 is in position Y. This use of the lever arm 1, as described, is provided to prevent a mistake by the operator of the dispenser. Thus, if the manually operated switch 647 has not been set for the use of the control unit by throwing same toward the right, there will be no electrical current available to switch 649 and therefore also to electromagnetic coil 657. Hence, when the operator attempts to set the control, it will not be possible with one hand as lever 1, after being pulled downward to position Y, will immediately return to position X since the electromagnetic coil 657 will not hold the said lever 1 in the position Y and dial 3 cannot be pushed inward and turned for setting the desired amount unless lever 1 is in position Y.

Switch 647 is a double pole, double throw manually operated switch in order to permit the operator to set the control dial before starting the pump motor and therefore before said operator removes the nozzle from its fixed position in the housing. Removal of the nozzle from its fixed position automatically closes switch 625, thus starting the motor driven pump 627.

Since switch 659 is wired in parallel circuit with switch 649, there is no interruption of electric power when time delay switch 649 automatically breaks the circuit as switch 659 remains with contacts closed until it is relieved by the action of nut section 105 dropping into the space afforded by the reduced diameter section 85 of shaft 81. When said switch 659 is de-energized by the said movement of nut section 105, the electric circuit through valve 645 is broken, thus causing said valve 645 to return to its normal closed position, thus immediately stopping the flow of fuel. At the same time, when the electric circuit through switch 659 is broken, the electromagnetic coil 657 is de-energized, thus releasing lever 1, which immediately returns from position Y to position X.

It will be obvious that the control unit could be set by the use of only dial 3 and switch 659, thus eliminating lever 1, coil 657 and switch 649 with all the mountings and wiring required therefor, but to operate in this manner there should be some signal device or safety provision to be sure that the control unit was connected through switch 647. Otherwise, the operator could set the control unit and still have switch connected through OA in error, and with this situation, the receptacle receiving the fuel would likely overflow before the error is discovered. This might well prove dangerous and is in any event very undesirable.

Also a single pole, double throw switch could be used as switch 647, but if such a switch were used for switch 647, it would be necessary for the operator to first remove the nozzle from the standard position in the dispenser and insert same into the opening in the receiving receptacle provided therefor, thus closing switch 647 and thereby providing electric power to the control unit.

It should be understood that lever 1, as provided for use with the electrical control herein described and shown in FIGURE 27 is provided with shoulder 7, FIGURES 1, 2 and 3, which obstructs the passage of hub 18 through hole in the face plate until said lever 1 is in position Y.

As shown in the diagram FIGURE 27, when fuel is delivered without use of the control unit, the circuits are Line—625—O—A—645—Line for the valve. The motor circuit is unaffected by any other connections.

When the control unit is used, a temporary circuit is set: Line—P—B—C—649—D—657—A—645—Line, followed in a very short time by Line—P—B—C—659—D—657—A—645—Line, which latter is the circuit controlled by the control unit. A temporary circuit is controlled by the time delay switch 649 only.

From the foregoing description, it will be seen that the present invention fully accomplishes the aims and objects hereinbefore set forth. Further, it will be appreciated that various modifications may be made in the control device without departing from the scope of the invention as defined in the following claims.

We claim:

1. A control device for attachment to a liquid dispenser connected to liquid supply means for conveying liquid from a bulk supply thereof to an outlet nozzle valve, a computer cooperating with said supply means for computing the monetary value of the liquid dispensed, said control device adapted to be driven by the liquid dispenser and adapted to discontinue liquid flow from said outlet nozzle when a preselected monetary value of liquid has flowed therethrough, said control device comprising; actuator means connected to the computer to be driven thereby in accordance with the monetary rate being indicated by said computer, impulse means adapted to close the outlet valve, release means operated by the actuator means to activate the impulse means, and manually operated means for cocking and setting the release means at a position corresponding to a predetermined selected monetary value to be recorded on the computer.

2. A control device for attachment to a liquid dispenser having an outlet nozzle valve connected thereto, said dispenser having a computer for computing the monetary value of the liquid dispensed, said control device cooperating with the liquid dispenser and adapted to discontinue liquid flow from said outlet nozzle when a preselected monetary value of liquid has flowed therethrough, said control device comprising; actuator means connected to the computer to be driven thereby in accordance to the monetary value being recorded on said computer, an impulse pressure means adapted to close the outlet nozzle, release means operated by the actuator means to activate the impulse pressure means, and manually operated means for cocking and for setting the release means at a position corresponding to a preselected monetary value to be recorded on said computer.

3. A control device for attachment to a liquid dispenser connected to liquid supply means for conveying liquid from a bulk supply thereof to an outlet nozzle valve, a computer cooperating with said supply means for computing the monetary value of the liquid dispensed, said control device adapted to be driven by the liquid dispenser and adapted to discontinue liquid flow from said outlet nozzle valve when a preselected monetary value of liquid has flowed therethrough, said control device comprising; actuator means connected to the computer to be driven thereby in accordance with the monetary rate being indicated by said computer, electrical means including a valve for starting and stopping the flow of liquid from said dispenser, release means operated by the actuator means to deenergize the electrical means, and manually operated means for cocking and setting the release means at a position corresponding to a predetermined selected monetary value to be recorded on the computer.

4. A control device for attachment to a liquid dispenser connected to liquid supply means for conveying liquid from a bulk supply thereof to an outlet nozzle valve, a computer cooperating with said supply means for computing the monetary value of the liquid dispensed, said control device adapted to be driven by the liquid dispenser and adapted to discontinue liquid flow from said outlet nozzle when a preselected monetary value of liquid has flowed therethrough, said control device comprising; actuator means connected to the computer to be driven thereby in accordance with the monetary rate being indicated by said computer, impulse means adapted to close the outlet valve, release means operated by the actuator means to activate the impulse means, and manually operated means for cocking and setting the release means at a position corresponding to a predetermined selected monetary value to be recorded on the computer, and indicia carrying means cooperating with the manually operated means for indicating the monetary value of liquid to be dispensed.

5. A control device for attachment to a liquid dispenser connected to liquid supply means for conveying liquid from a bulk supply thereof to an outlet nozzle valve, a computer cooperating with said supply means for computing the monetary value of the liquid dispensed, said control device adapted to be driven by the liquid dispenser and adapted to discontinue liquid flow from said outlet nozzle when a preselected monetary value of liquid has flowed therethrough, said control device comprising; a lead screw connected to the computer to be driven thereby in accordance to the rate of the monetary value being recorded on the computer, impulse means adapted to close the outlet nozzle valve, release means including a partial nut adapted to be driven by said lead screw, said release means operated by the actuator means to activate the impulse means, and manually operated means for positioning the partial nut at a position on the lead screw corresponding to a preselected monetary value to be indicated on the computer and for cocking the impulse means.

6. A control device for attachment to a liquid dispenser connected to liquid supply means for conveying liquid from a bulk supply thereof to an outlet nozzle valve, a computer cooperating with said supply means for computing the monetary value of the liquid dispensed, said control device adapted to be driven by the liquid dispenser and adapted to discontinue liquid flow from said outlet nozzle when a preselected monetary value of liquid has flowed therethrough, said control device comprising; a lead screw connected to the computer to be driven thereby in accordance to the rate of the monetary value being recorded on the computer, pressure impulse means adapted to close the outlet nozzle valve, release means including a partial nut adapted to be driven by the lead screw, said lead screw having a recess for receiving the partial nut when said nut completes its travel across the threaded portion of said screw at which time said computer connection is disengaged, and manually operated means for positioning the partial nut at a position on the lead screw corresponding to a preselected monetary value to be indicated on the computer and for cocking the impulse means.

7. A control device for attachment to a liquid dispenser connected to liquid supply means for conveying liquid from a bulk supply to an outlet nozzle having a control valve, a computer cooperating with said supply means for computing the monetary value of the liquid dispensed, said control device adapted to discontinue liquid flow from said outlet nozzle when a preselected monetary value of liquid has flowed therethrough, said control device comprising; a lead screw having drive means connected to the computer, said drive means adapted to be driven at a rate proportional to the monetary value being indicated by the computer, a pressure fluid impulse means adapted to close the nozzle control valve, release means for said pressure means actuated by the lead screw, said release means including a partial nut adapted to be driven by the lead screw, manually operated means for cocking the pressure means and for setting the partial nut at a position on the lead screw corresponding to a selected monetary value of fluid to flow through the liquid dispenser, said manually operated means having indicia thereon indicating the monetary value of liquid to flow through said outlet nozzle.

8. A control device for attachment to a liquid dispenser connected to liquid supply means for conveying liquid from a bulk supply to an outlet nozzle having a control valve, a computer cooperating with said supply means for computing the monetary value of the liquid dispensed, said control device adapted to discontinue liquid flow from said outlet nozzle when a preselected monetary value of liquid has flowed therethrough, said control device comprising; a lead screw having drive means connected to the computer, said drive means adapted to be driven at a rate proportional to the monetary value being indicated by the computer, said supply means including an electrically operated valve, first manually operated switch means adapted to open and close said electrically operated valve, second switch means connected to the first switch means, third switch means connected to the second switch means, release means for actuating said third switch means, said release means including a partial nut adapted to engage the threads on said lead screw, manually operated means for closing said second switch means and for setting the partial nut on the lead screw at a position corresponding to a preselected monetary value of fluid to flow through the liquid dispenser.

9. A control device for attachment to a liquid dispenser connected to liquid supply means for conveying liquid from a bulk supply to an outlet nozzle having a control valve, a computer cooperating with said supply means for computing the monetary value of the liquid dispensed, said control device adapted to discontinue liquid flow from said outlet nozzle when a preselected monetary value of liquid has flowed therethrough, said control device comprising; a lead screw having drive means connected to the computer, said drive means adapted to be driven at a rate proportional to the monetary value being indicated by the computer, a pressure fluid impulse means adapted to close the nozzle control valve, said impulse pressure means including a cylinder, a piston slidably mounted in the cylinder, a spring normally urging the piston toward one end of the cylinder, and conduit means connecting said one end of the cylinder with the nozzle control valve, impulse release means for actuating said impulse pressure means, and first manually operated means for urging said piston adjacent the other end of the cylinder against the tension of said spring, second manually operated means adapted for setting the impulse release means at a position corresponding to a preselected monetary value for liquid to flow through the dispenser and for latching said piston at said other end of the cylinder.

10. The invention defined in claim 9 wherein said impulse release means includes a partial nut adapted to engage the threads on said lead screw and to be positioned in different locations thereon.

11. A control device for attachment to a liquid dispenser connected to liquid supply means for conveying liquid from a bulk supply to an outlet nozzle having a control valve, a computer cooperating with said supply means for computing the monetary value of the liquid dispensed, said control device adapted to discontinue liquid flow from said outlet nozzle when a preselected monetary value of liquid has flowed therethrough, said control device comprising; actuator means connected to the computer to be driven at a rate proportional to the monetary value being indicated by the computer, a solenoid operated flow control valve associated with the liquid supply means, and switch means connected to a source of electrical power and to said solenoid, release means actuated by the actuator means, and manually operated means for closing said switch means and for setting the release means at a position corresponding to a selected monetary value of fluid to flow through the dispenser thereby to open said switch when a preselected monetary value of liquid has flowed through the dispenser.

12. The invention defined in claim 9 wherein the nozzle control valve is manually opened and is closed by compressed fluid, and said conduit means connecting the said one end of the cylinder and nozzle control valve includes a flexible tube disposed within the hose connected to the nozzle.

13. A control device for attachment to a liquid dispenser connected to liquid supply means for conveying liquid from a bulk supply to an outlet nozzle having a control valve, a computer cooperating with said supply means for computing the monetary value of the liquid dispensed, said control device adapted to discontinue liquid flow from said outlet nozzle when a preselected monetary value of liquid has flowed therethrough, said control device comprising; actuator means adapted to be driven by the computer, impulse pressure means including an air line communicating with the nozzle control valve, release means actuated by said actuator means to trip said impulse pressure means to close said nozzle control valve to discontinue liquid flow from said nozzle when a selected monetary value of liquid has flowed through the dispenser.

14. A control device for attachment to a liquid dispenser connected to liquid supply means for transferring liquid from a bulk supply to an outlet nozzle valve, said liquid supply means including a flexible fluid delivery hose disposed between the dispenser housing and nozzle valve, a computer cooperating with said supply means for indicating the monetary value of the liquid dispensed, said control device adapted to discontinue liquid flow from said outlet valve when a preselected monetary value of liquid has flowed therethrough; the improvement comprising: actuator means adapted to be driven by the computer in accordance with the monetary amount being indicated by said computer, pressure means adapted to close the outlet valve, release means for activating the pressure means, said pressure means including a pressure transmitting conduit positioned within said flexible fluid delivery hose, and manually operated means for setting the release means at a position corresponding to a predetermined selected monetary value to be indicated on the computer.

15. A control device as set forth in claim 14 wherein the outlet nozzle is provided with latch means and a hand-operated lever adapted to actuate the outlet valve, a pressure fluid chamber cooperating with the outlet valve and the hand-operated lever and adapted to release the latch means upon changes in the pressure in the pressure fluid chamber, an air passageway in communication with the nozzle spout and with said pressure chamber, and means responsive to the pressure means for blocking said air passageway.

16. A control device as set forth in claim 14 wherein a swivel is disposed between the nozzle and the flexible delivery hose, said swivel having a pair of spaced pins and a stop member adapted to cooperate with said pins to prevent the swivel from rotating in an arc of a complete circle, and armor means surrounding the portion of pressure transmitting conduit passing through said swivel so that the transmitting conduit will remain substantially circular in cross section.

17. A control device as set forth in claim 14 wherein the actuator means includes a lead screw and a bearing carrying a spring clutch for disengaging the screw by a snubbing action when the release means is actuted so that the lead screw will stop in a controlled position at all times.

18. Fluid flow dispensing means including a liquid dispenser having supply means to convey liquids from a bulk supply through a flexible fluid delivery hose to an outlet valve, releasable means for holding the outlet valve in a fluid flow position, said releasable means including a hand-operated lever for actuating the outlet valve, latch means engageable with said lever and adapted to maintain the lever in the valve open position, spring means urging the latch means to hold the lever in the valve open position, a spring urged detent normally urging the latch means in the lever engaging position, a pressure fluid chamber associated with the latch means and adapted to actuate the detent against the urging of its spring when energized, means for energizing the pressure fluid chamber including a computer adapted to determine the monetary value of the fluid discharged through the outlet nozzle, pressure fluid impulse means associated with the computer, a pressure fluid transmitting conduit connecting the pressure fluid impulse means and said pressure fluid chamber, said pressure fluid transmitting connecting conduit positioned within said flexible fluid delivery hose and protected from damage and blockage thereby.

References Cited by the Examiner
UNITED STATES PATENTS

| | | | |
|---|---|---|---|
| 1,917,364 | 7/33 | Gallagher | 222—20 X |
| 3,009,605 | 11/61 | Ripley | 222—20 |
| 3,128,910 | 4/64 | Calhoun | 222—20 |
| 3,138,289 | 6/64 | Jones et al. | 222—20 |

RAPHAEL M. LUPO, *Primary Examiner.*

LOUIS J. DEMBO, *Examiner.*